US012141021B2

(12) United States Patent
Zhang et al.

(10) Patent No.: US 12,141,021 B2
(45) Date of Patent: Nov. 12, 2024

(54) PROGRAMMATIC SELECTION OF BREAKPOINTS AND TABLE VALUES FOR A LOOKUP TABLE THAT CONFORMS WITH AN ERROR TOLERANCE

(71) Applicant: The MathWorks, Inc., Natick, MA (US)

(72) Inventors: Yifu Zhang, Natick, MA (US); Yuan Yuan, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 10 days.

(21) Appl. No.: 18/153,713

(22) Filed: Jan. 12, 2023

(65) Prior Publication Data

US 2023/0153185 A1    May 18, 2023

Related U.S. Application Data

(63) Continuation-in-part of application No. 17/210,613, filed on Mar. 24, 2021, now Pat. No. 11,579,956.

(60) Provisional application No. 63/386,827, filed on Dec. 9, 2022, provisional application No. 63/386,630, filed on Dec. 8, 2022, provisional application No. 63/123,122, filed on Dec. 9, 2020.

(51) Int. Cl.
*G06F 9/44* (2018.01)
*G06F 11/07* (2006.01)
*G06F 11/36* (2006.01)

(52) U.S. Cl.
CPC ...... *G06F 11/0754* (2013.01); *G06F 11/3608* (2013.01)

(58) Field of Classification Search
None
See application file for complete search history.

(56) References Cited

U.S. PATENT DOCUMENTS

| 11,151,125 | B1 * | 10/2021 | Dwivedi | G06F 9/54 |
| 11,263,229 | B1 * | 3/2022 | Basavaiah | G06F 16/245 |
| 11,269,876 | B1 * | 3/2022 | Basavaiah | G06F 8/77 |
| 2003/0018953 | A1 * | 1/2003 | Aberg | G06F 8/34 |
| | | | | 717/105 |

* cited by examiner

*Primary Examiner* — Qamrun Nahar
(74) *Attorney, Agent, or Firm* — GOODWIN PROCTER LLP

(57) ABSTRACT

Exemplary embodiments may programmatically determine the number and locations of breakpoints and table values in a lookup table so as to reduce their counts. In some exemplary embodiments, the minimum number of breakpoints and breakpoint locations that conform with the error tolerance may be determined along with table values for those breakpoints. The exemplary embodiments may determine if a lookup table that conforms with the error tolerance is feasible and may inform a user of the feasibility or infeasibility of generating the lookup table. Where it is feasible to generate the lookup table, the exemplary embodiments may provide automatic programmatic generation of a lookup table with minimal breakpoints and optimal or near-optimal table values.

20 Claims, 17 Drawing Sheets

LOOKUP TABLE 100

| BREAKPOINTS 102 | TABLE VALUES 104 |
|---|---|
| $bp_1$ | $tv_1$ |
| $bp_2$ | $tv_2$ |
| $bp_3$ | $tv_3$ |
| $bp_4$ | $tv_4$ |
| $bp_5$ | $tv_5$ |

FIG. 1
PRIOR ART

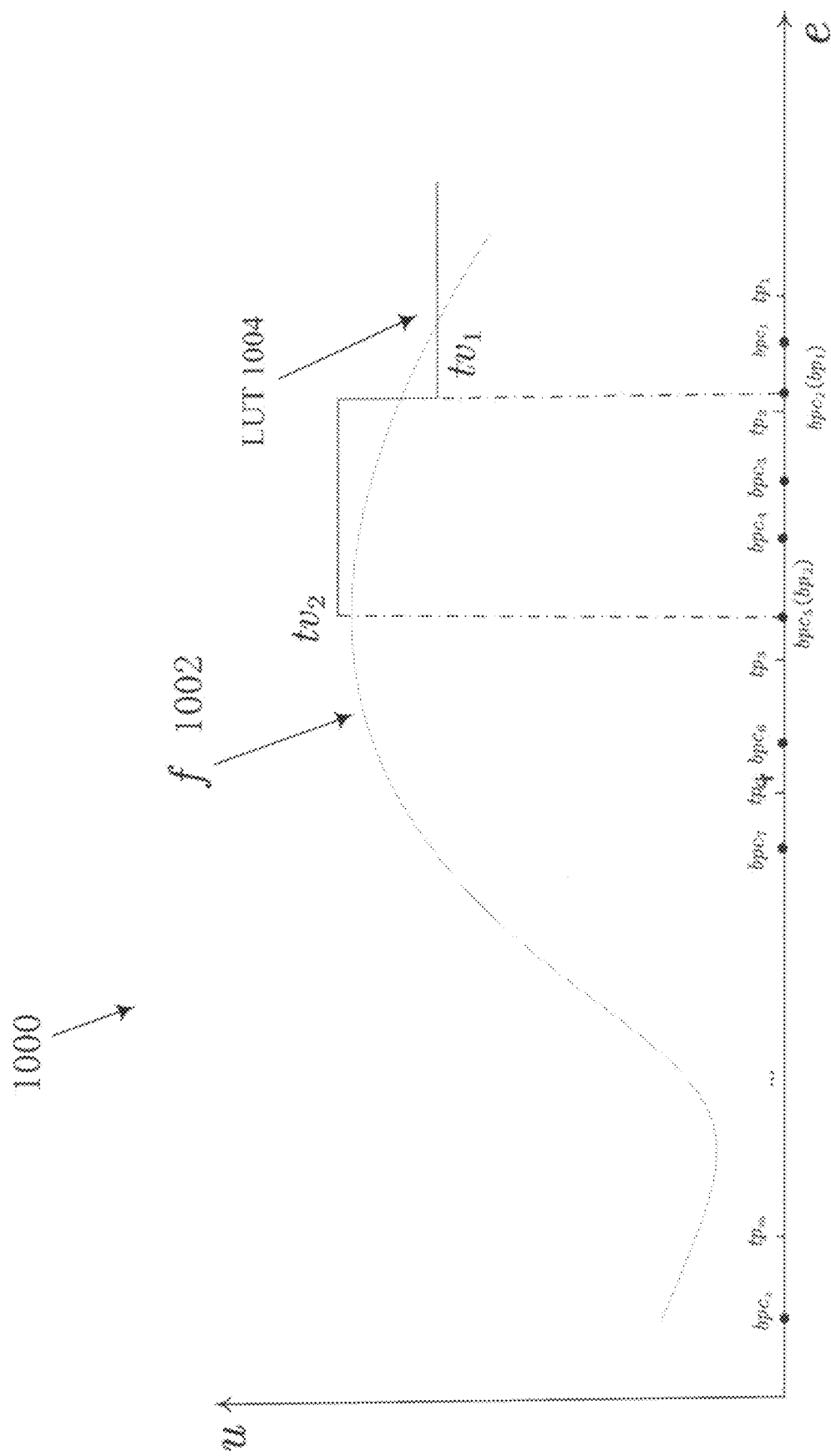

PROGRAMMATIC SELECTION OF BREAKPOINTS AND TABLE VALUES FOR A LOOKUP TABLE THAT CONFORMS WITH AN ERROR TOLERANCE

RELATED APPLICATIONS

This application is a continuation in part of U.S. patent application Ser. No. 17/210,613, filed on Mar. 24, 2021, which claims the benefit of U.S. Provisional Application No. 63/123,122, filed on Dec. 9, 2020. Additionally, this application claims the benefit of U.S. Provisional Application No. 63/386,630, filed on Dec. 8, 2022 and U.S. Provisional Application No. 63/386,827, filed on Dec. 9, 2022. The entire contents of these applications are incorporated by reference herein in their entirety.

SUMMARY

In accordance with a first inventive facet, a method is performed by a processor of an electronic device. Per the method, with the processor, a next breakpoint is determined for a lookup table that produces output values based for input values according to a function or a set of data values that the table approximates. The next breakpoint lies between a most recently established breakpoint in a breakpoint sequence and a breakpoint candidate positioned at a smallest input value of the lookup table among positions of breakpoint candidates. The breakpoint sequence extends from a breakpoint positioned at a largest input value of the lookup table among positions of the breakpoints to a breakpoint positioned at a smallest input value of the lookup table among positions of the breakpoints. An associated table value is determined for the next breakpoint in the lookup table. The next breakpoint is determined by identifying breakpoint candidates that lie between the most recently established breakpoint and a breakpoint candidate with a position at a smallest input value of the lookup table among the positions of the breakpoint candidates. Associated table values for the identified breakpoint candidates are determined. The next breakpoint is chosen from the identified breakpoint candidates as a breakpoint candidate that is in a subset of selected breakpoint candidates. In the subset, for each of the selected breakpoint candidates, an error function value of an output data value of the lookup table for each test point in an interval extending between the most recently established breakpoint and the selected breakpoint candidate is less than an error threshold. The next breakpoint is a breakpoint candidate positioned at a smallest input value of the lookup table among positions of the selected breakpoint candidates in the subset. With the processor, at least a portion of the lookup table is generated with the most recently established breakpoint, the associated table value for the most recently established breakpoint, the next breakpoint, and the determined table value for the next breakpoint.

The determining of associated table values for the identified breakpoint candidates may entail determining optimal or near-optimal table values as the table values for the identified breakpoint candidates. These table values are optimal or near-optimal in that they are the table values that result in the lowest error between the function $f(x)$ and the output values for the lookup table. The lookup table may employ zero-order interpolation to provide output values for test points that are in between the breakpoints. The zero-order interpolation may be one of flat interpolation or nearest interpolation. In other embodiments where flat interpolation is used, the output values for input values in an interval between breakpoints may be that of the output value at the breakpoint with a smallest input value position in the interval. In other embodiments, the output values for input values in an interval between breakpoints may be that of the output value at the breakpoint with a largest input value position in the interval.

The method may further include determining if it is feasible to establish a breakpoint positioned at a largest input value of the lookup table among the positions of the breakpoints. Where it is determined to be feasible to establish a breakpoint positioned at a largest input value of the lookup table among the positions of the breakpoints, the breakpoint is established at a position of a largest input value of the lookup table among the positions of the breakpoints.

Instructions for performing the above methods may be stored on a non-transitory processor-readable storage medium.

In accordance with another inventive facet, an electronic device includes a non-transitory processor-readable storage medium storing computer programming instructions and a processor configured for executing the computer programming instructions. The computer programming instructions cause the processor to determine a next breakpoint for a lookup table that approximates a function or a set of data values and produces output values based on input values, wherein the next breakpoint lies between a most recently established breakpoint in a breakpoint sequence and a breakpoint candidate positioned at a smallest input value for the lookup table among positions of breakpoint candidates. The breakpoint sequence extends from a breakpoint positioned at a largest input value of the lookup table among positions of the breakpoints to a breakpoint positioned at a smallest input value of the lookup table among the positions of the breakpoints. The computer programming instructions further cause the processor to determine an associated table value for the next breakpoint in the lookup table. The next breakpoint is determined by identifying breakpoint candidates for breakpoints that lie between the last established breakpoint and the breakpoint candidate positioned at a smallest input value of the lookup table among positions of the breakpoint candidates. The associated table values for the identified breakpoint candidates are determined. The processor chooses from the identified breakpoint candidates as the next breakpoint a breakpoint that is in a subset of selected breakpoints candidates where, for each of the selected breakpoint candidates, an error function value of an output value of the lookup table for each test point in an interval extending between the most recently established breakpoint and the selected breakpoint candidate is less than an error threshold. The next breakpoint is a breakpoint candidate positioned at a smallest input value of the lookup table among positions of the selected breakpoint candidates in the subset. At least a portion of the lookup table is generated with the most recently established breakpoint, associated table value for the most recently established breakpoint, the next breakpoint, and the determined table value for the next breakpoint.

In accordance with a further inventive facet, a method is performed by a processor. Per the method, a next breakpoint that lies between a most recently established breakpoint and a breakpoint candidate positioned at a smallest input value of the lookup table among positions of the breakpoint candidates in a breakpoint candidate sequence is determined, and an associated table value for the next breakpoint in the lookup table is determined. The lookup table approximates a function or a set of data points. The next breakpoint may be determined by applying a binary search algorithm to the breakpoint candidates to locate the next breakpoint as a breakpoint candidate that is in a subset of selected breakpoint candidates where, for each of the selected breakpoint candidates, an error function value of an output value of the lookup table for each test point in an interval extending between the most recently established breakpoint and the selected breakpoint candidate is less than an error threshold. The next breakpoint is a breakpoint candidate positioned at a smallest input value of the lookup table among positions of the selected breakpoint candidates in the subset. Per the method, a processor generates at least a portion of the lookup table with the most recently established breakpoint, the associated table value for the most recently established breakpoint, the next breakpoint, and the determined table value for the next breakpoint.

The binary search algorithm, when used, may start with one of the breakpoint candidates positioned approximately halfway between the most recently established breakpoint and the breakpoint candidate positioned at the smallest input value of the lookup table among positions of the breakpoint candidates. The binary search algorithm may next examine one of the breakpoint candidates that is positioned approximately halfway between the most recently established breakpoint and the one of the breakpoint candidates positioned approximately halfway between the most recently established breakpoint and the breakpoint candidate positioned at the smallest input value for the lookup table among positions of the breakpoint candidates.

In accordance with an additional inventive aspect, a method is performed by a processor of an electronic device. Per the method, the processor selects breakpoints and table values for a lookup table that approximates a function or set of data points which are co-optimized such that breakpoint values are selected to minimize memory space required to store the lookup table, and table values for the breakpoint are chosen to reduce error between the table values and the values of the function at the breakpoints or values of the data points at the breakpoints. Per the method, the processor generates at least a portion of the lookup table with the breakpoints and table values.

The co-optimizing may entail selecting optimal or near-optimal table values for selected breakpoint candidates and choosing as a next breakpoint a chosen breakpoint from among positions of the selected breakpoint candidates that is in a subset of selected breakpoint candidates where, for each of the selected breakpoint candidates, an error function value of a data value output of the lookup table for each test point in an interval extending between a most recently established breakpoint and the selected breakpoint candidate is less than an error threshold, and the chosen breakpoint is the breakpoint candidate possessing the smallest input value position among the positions of the selected breakpoint candidates in the subset.

Instructions for performing the above methods may be stored in a non-transitory processor-readable storage medium.

Per a still further inventive facet, a method is performed by a processor of an electronic device. The method includes determining if it is feasible to determine a next breakpoint that lies between a most recently established breakpoint in a breakpoint sequence and a breakpoint candidate positioned at a smallest input value of a lookup table among positions of the breakpoint candidates such that an error function value of a data value output of the lookup table for each test point in an interval extending between the most recently established breakpoint and the next breakpoint is less than an error threshold. If it is determined to not be feasible, an indication of infeasibility is output. If it is determined to be feasible, a next breakpoint is determined that lies between the most recently established breakpoint and a breakpoint candidate positioned at a smallest input value of the lookup table among positions of breakpoint candidates in a breakpoint candidate sequence, and an associated table value for the next breakpoint in a lookup table is determined. The lookup table approximates a function or set of data points. The next breakpoint is determined by applying a binary search algorithm to the breakpoint candidates to locate the next breakpoint as a breakpoint candidate that is in a subset of selected breakpoint candidates where, for each of the selected breakpoint candidates, an error function value of an output data value of the lookup table for each test point in an interval extending between the most recently established breakpoint and the selected breakpoint candidate is less than an error threshold. The next breakpoint is a breakpoint candidate positioned at a smallest input value of the lookup table among positions of the selected breakpoint candidates in the subset. Per the method, a processor generates at least a portion of the lookup table with the most recently established breakpoint, the table value for the most recently established breakpoint, the next breakpoint, and the determined table value for the next breakpoint.

BRIEF DESCRIPTION OF THE DRAWINGS

FIG. 1 depicts a conventional lookup table.

FIG. 10A depicts an illustrative plot that helps illustrate establishment of the initial breakpoint in exemplary embodiments.

DETAILED DESCRIPTION

A lookup table is an array that replaces a runtime computation with a lookup operation. The lookup table maps input values to output values. FIG. 1 depicts an illustrative lookup table 100. The lookup table has breakpoints 102 ($bp_1, \ldots, bp_5$) and table values 104 ($tv_1, \ldots, tv_5$). Each breakpoint 102 represents an input value to which a corresponding output value (i.e., a table value 104) is mapped. Thus, breakpoint $bp_1$ is an input value that maps to output value $tv_1$. This lookup table 100 is a simplified table. The lookup table may be multidimensional. The breakpoints 102 and the table values 104 may be vectors in some instances.

Figure 2:
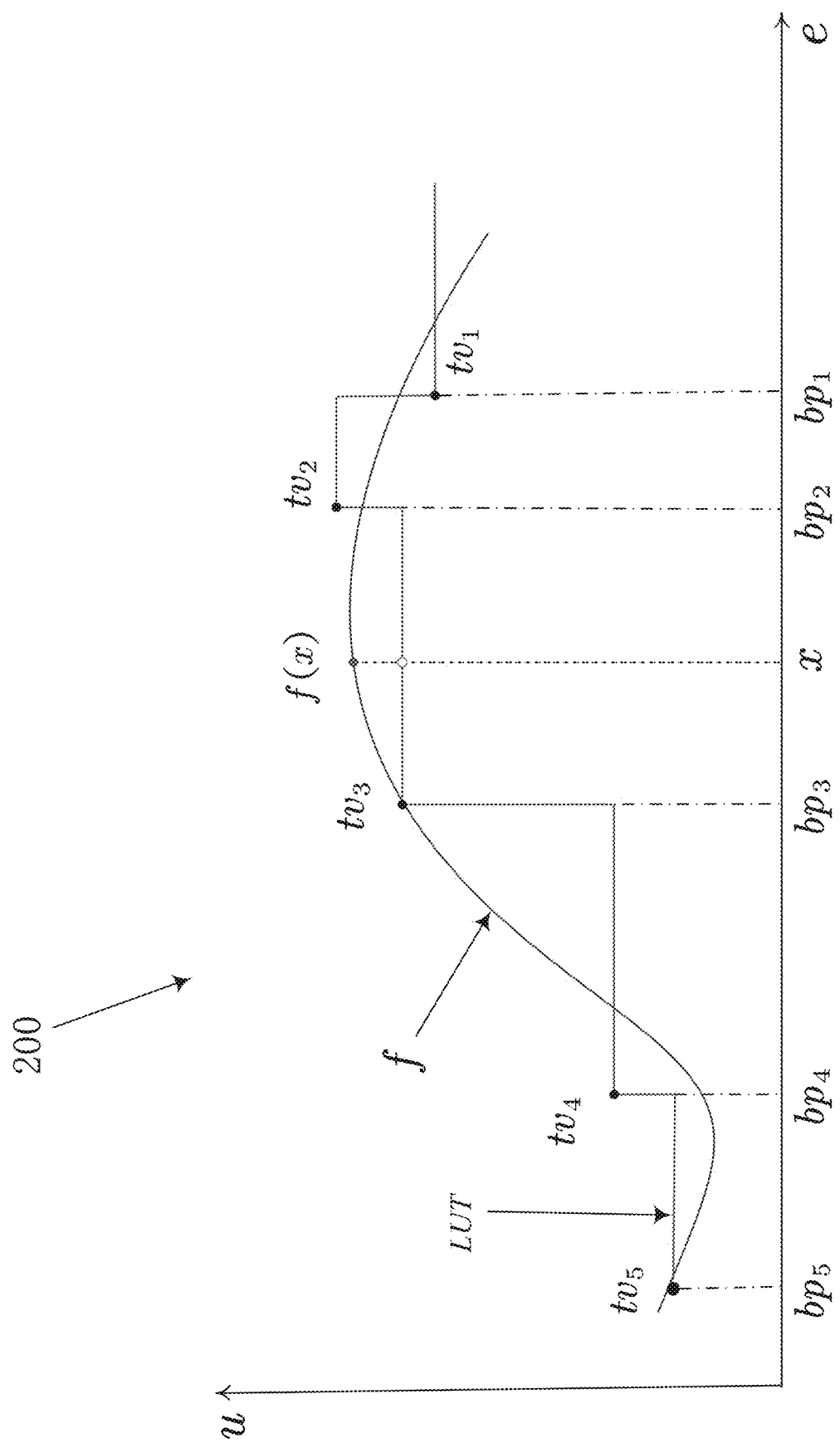
FIG. 2 depicts a conventional plot of a function and a plot of lookup table values that approximate the function.

One use of a lookup table is to replace computation of a function with a table lookup operation. FIG. 2 depicts a plot 200 of $u=f(x)$, where u is a dependent variable as a function $f(\ )$ of an independent variable x. The curve of the value of $f(x)$ is shown for various values of x. The breakpoints $bp_1, \ldots, bp_5$ for the lookup table that represents the function $f(x)$ are shown. As can be seen, each breakpoint represents an input value x for the function $f(x)$. The table values in this instance approximate the value of u (i.e., $f(x)$) for the input value of the breakpoint.

The lookup table 100 does not have a breakpoint for each possible input value. Having all of the input values would result in a very large table and is not practical or even possible in some instances, such as having all real values in the interval [0, 1] as input values, in which case the number of input values is infinite. Hence, when a lookup table is in use, the input value usually does not exactly match one of the breakpoint values. FIG. 2 shows a plot of $f(x)$ and lookup table (LUT) values. The input value x is an example of an input that lies between breakpoints $bp_2$ and $bp_3$. In order to account for input values that do not fall on a breakpoint, interpolation may be used. FIG. 2 shows an example where flat interpolation may be used. In this example, for all the input values falling in the interval extending from $bp_3$ up to but not including $bp_2$, the output value is $tv_3$. Alternately, the lookup table may be constructed so that for all of the input values failing in an interval specified by two breakpoints, the flat interpolation instead chooses the output value at the breakpoint that possesses higher value among the two breakpoints that specifies the interval. In that instance, for the interval extending from bp3 to bp2, the output values for all of the input values in the interval would be tv2. Graphically, this flat interpolation is reflected as the flat line for the lookup table values from $bp_3$ up to but not including $bp_2$ in FIG. 2.

Figure 3A:
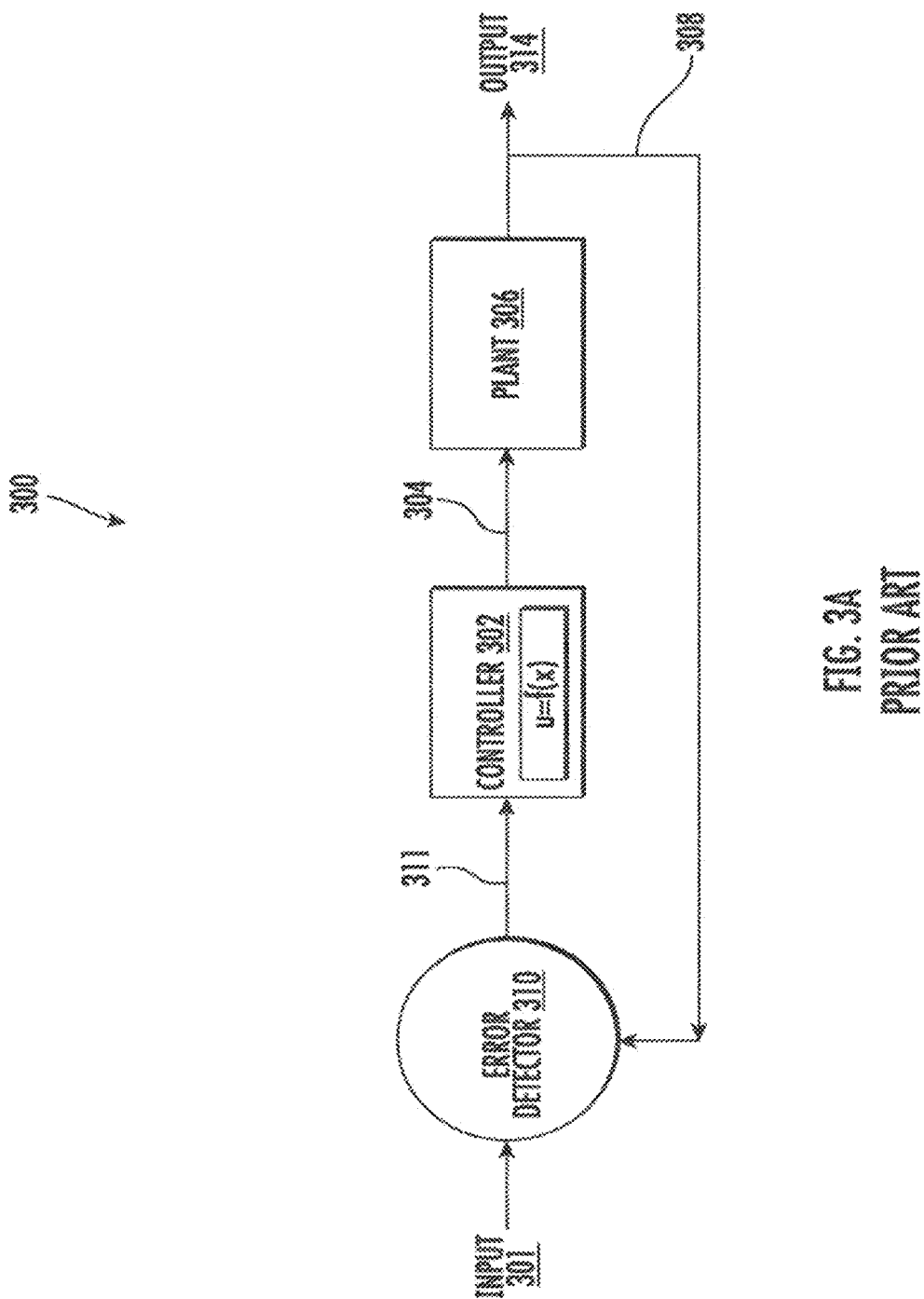
FIG. 3A depicts a conventional control system that uses a control function.

Lookup tables have a wide range of uses. For example, lookup tables may be used to approximate nonlinear activation functions in neural networks, approximate trigonometric functions, approximate computationally expensive functions, etc. Lookup tables are used in a wide variety of engineering and mathematical applications. One use is in control systems where a control function $f(x)$ is needed to determine how to control a plant. FIG. 3A shows an example of such a conventional control system 300. A controller 302 controls a plant 306 by providing a control signal 304 to the plant. The generation of the control signal value entails calculating the control function $u=f(x)$. The controller 302 calculates the value u of the control signal 304 based on the value x of an error signal 311 that is calculated by an error detector 310. The error detector 310 receives an input 301 and determines the error based on the previous value of the output 314 and the current input 301. The output 314 is fed back via a feedback loop 308 to the error detector 310. The error signal 311 may represent the difference between the previous output and the current input. The controller 302 attempts to reduce the error and generates a control signal 304 to adjust the plant 306 accordingly.

Figure 3B:
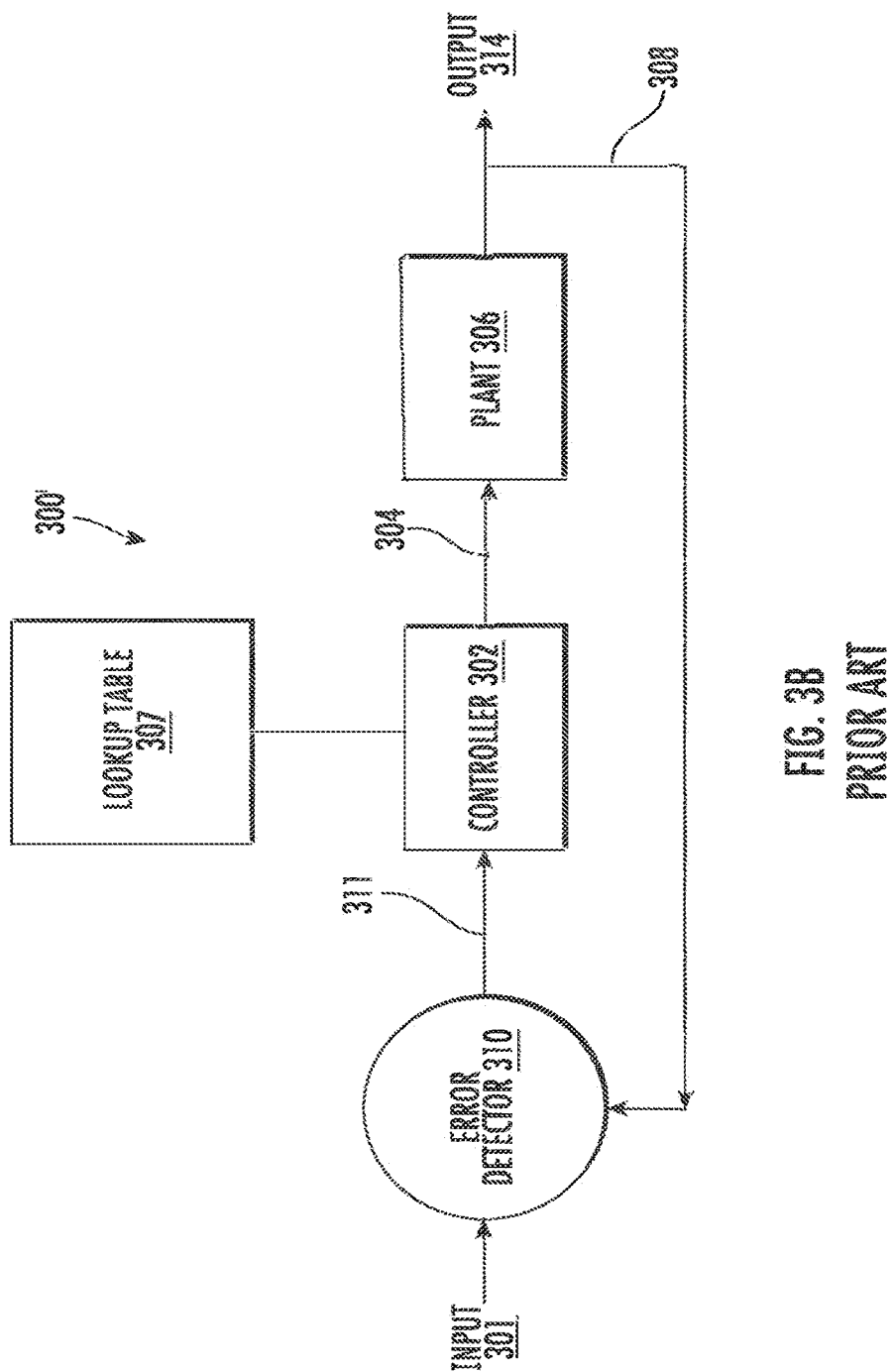
FIG. 3B depicts a conventional control system that uses a lookup table to approximate a control function.

It may be computationally expensive and slow to calculate the value of u by determining $f(x)$ for each time that the control signal needs to be updated. Hence, a lookup table 307 may be used to provide a tabular representation of $f(x)$. FIG. 3B shows a control system 300' where the computation of the control function is replaced with a lookup table 307. The components of control system 300' are otherwise the same as control system 300. The operation of accessing the lookup table value may be much faster and less computationally intensive than determining the control function value, but the operation may introduce some approximation error while representing the function.

Because using a lookup table to replace a function or data set in general leads to approximation error, there is a need to adjust lookup table parameters (e.g., table values, number and/or position of breakpoints, and/or data type of the table values) such that the approximation error remains within a satisfactory range defined by some error criterion. In the exemplary embodiments, the error criterion is captured in something denoted herein as "error tolerance".

Selecting how many breakpoints to include in a lookup table and selecting the locations of the breakpoint and their associated table values may be difficult. The number of breakpoints and their corresponding table values has a direct impact on how much memory is needed to store a lookup table. In general, fewer breakpoints results in less memory required for storing the lookup table. Thus, it is generally desirable to reduce the number of breakpoints and table values in the lookup table. However, there is a countervailing concern of whether the output values for the lookup table conform with a desired error tolerance. Reducing the number of breakpoints may cause the error for some output values to exceed the error tolerance. Exemplary embodiments may programmatically determine the number and locations of breakpoints so as to reduce the number of breakpoints. In some exemplary embodiments, the minimum number of breakpoints and breakpoint locations and their corresponding table values that conform with the error tolerance may be determined.

The exemplary embodiments may provide automatic programmatic generation of a lookup table. "Automatic programmatic generation" means that the lookup table is generated by one or more processors executing computer programming instructions. The exemplary embodiments may adopt an approach to generating the table that requires only low computational cost operations and use of computational resources to determine optimal table values. In some exemplary embodiments, the lookup table breakpoints and values for the generated lookup table may be optimal or near-optimal table values.

Exemplary embodiments may also provide an indication of whether it is feasible to generate a lookup table that satisfies a specified error tolerance indication. The specified error tolerance indication may be a function whose value evaluated at an input value is a tolerance metric for the approximation gap between the function $f(x)$ value and the lookup table's output value at the input value. Specifically, the gap at the input value is the absolute value of $(\alpha-\beta)$, where $\alpha$ is the function value evaluated at the input value, and β is the lookup table's output evaluated at the input value. For instance, in FIG. 2, the gap at input value x is $f(x)-tv_3$. The exemplary embodiments may output an indication of whether or not the generation of the lookup table is feasible and/or may output an indication of a feasibility margin that specifies a margin of error between the table values and the underlying function or data points that the table represents.

The inputs may specify a function $f(x)$ or may specify data points. In some instances, a user may not know the exact input-output relation for a set of data points, so the set of data points is itself specified instead, or it may be the case that the data points may not correspond to a mathematical 'function' due to there being two or more observed output values for the same input value x. The exemplary embodiments may perform a feasibility analysis and generate a lookup table for both the case where a function $f(x)$ is input or where data points are input. A data point may be a tuple (x, y), where x is the data point's horizontal value and y is the data point's vertical value. For narrative simplicity, this discussion refers to a data point's horizontal value as its x value and its vertical value as its y value. In addition, the exemplary embodiments are able to adapt the lookup table to account for new data points.

Figure 4:
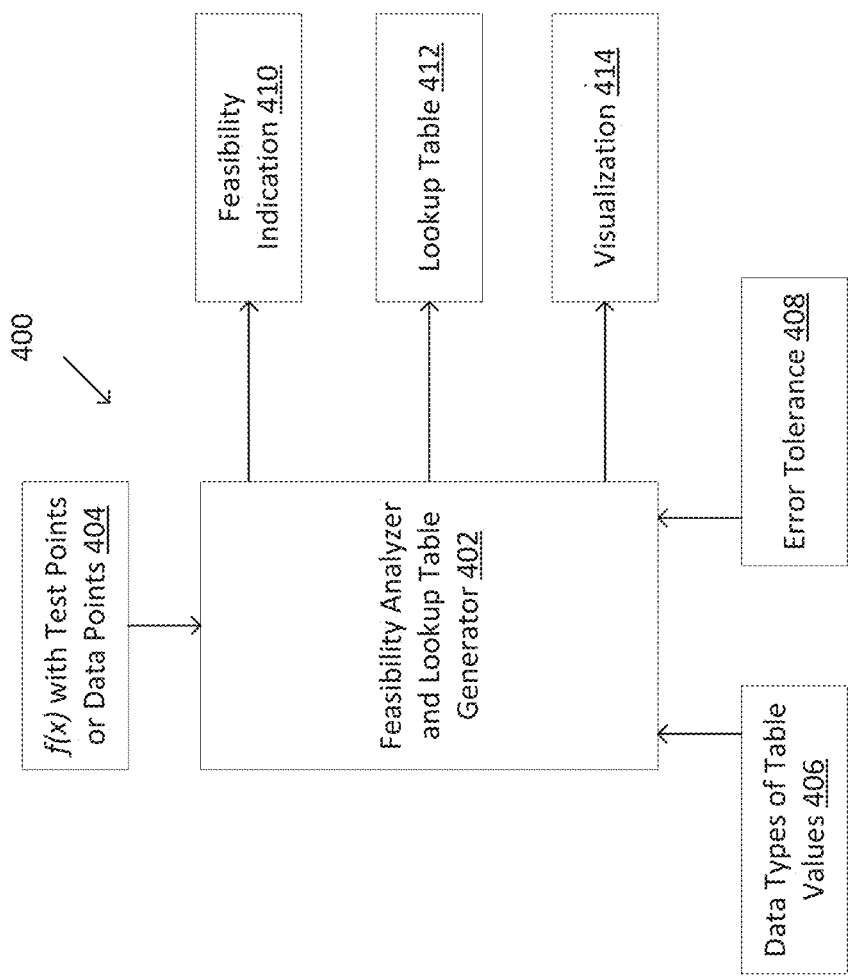
FIG. 4 depicts a block diagram of the inputs and outputs of the feasibility analyzer and the lookup table generator of an exemplary embodiment.

FIG. 4 depicts a diagram 400 showing the inputs and outputs for the feasibility analyzer and lookup table generator 402 that may be used in the exemplary embodiments in checking feasibility of generating a lookup table and where it is determined that such generation of a lookup table is feasible, generating the desired lookup table with breakpoints that help reduce the amount of memory required by the lookup table and table values that conform with the error tolerance. The feasibility analyzer and lookup table generator 402 performs the feasibility analysis, lookup table generation, visualization of output, generation of suggestions, and accommodation of additional data values that are described below. A user may specify a number of inputs in order for the feasibility analyzer and lookup table generator 402 to properly analyze feasibility of generating a lookup table and to programmatically generate the lookup table. The user may be a person or a programmatic entity that provides the inputs. The user has an option of specifying a function $f(x)$ with test points 404, such as by inputting a handle or other unique identifier of computer programming code for performing the function. The specified function is the one for which the lookup table holds approximate values to avoid computation of the function each time a function value is needed. Alternatively, the user may specify a set of data points. The lookup table attempts to approximate these data points. The user may provide as input some information for accessing the data points in memory or storage.

The feasibility analyzer and lookup table generator 402 may receive an indication of a data type for table values 406. The data type for a table value may be, for example, floating point, integer, etc. The data type constrains values that a table value may take. The definition of a data type specifies an in-memory representation, so the choice of a data type results in a choice of the in-memory representation. This in-memory representation may limit the resolution of values by limiting the number of bits allocated for storing the values in memory. The feasibility analyzer and lookup table generator 402 additionally may receive an error tolerance 408. The error tolerance 408 specifies what amount of approximation error is acceptable to the user for a given input value. The error tolerance 408 need not be constant across all input values; rather the error tolerance may vary across input values. The error tolerance 408 may be expressed as a function as mentioned above. The user thus may pass a handle to computer programming code for performing the error tolerance function. The errors to which the error tolerance 408 is applied are the approximation errors between the values returned by the lookup table across test points (e.g., a collection of input values of interest to the user) and the actual values of the function $f(x)$ when the lookup table approximates $f(x)$, or alternatively, when the lookup table approximates a data set of data points, the approximation error for each data point is between the y value of the data point and the lookup table's output evaluated at the x value of the data point. If the user provides a function $f(x)$, the user provides the test points as well. If the user provides a data set to approximate, the approach described herein determines the test points, where the test points are the collection of distinct x values of data points in the data set.

As was mentioned above, the feasibility analyzer and lookup table generator 402 may produce a feasibility indication 410 as output. The feasibility indicator 410 may indicate whether it is feasible or not to generate the lookup table given the inputs. The feasibility indication 410 may be a binary value that assumes one of two values, such as "feasible" or "infeasible." The feasibility indication 410 may in some embodiments be output as a value, such as 1 or 0, or alternatively "True" or "False." In some exemplary embodiments, a textual or graphical output indicative of the generation of the lookup table as being feasible or infeasible may be output on a display device. For example, text may be displayed that says, "It is feasible to generate a lookup table," or "It is not feasible to generate a lookup table." Audio or video output may be generated as part of the feasibility indication 410. The feasibility indication 410 instead of or in addition to the outputs specified above may include a feasibility margin. The feasibility margin specifies, for possible input values and table values chosen by the feasibility analyzer and lookup table generator 402, a margin between the calculated or estimated error and the error tolerance. If all of the error values are not bigger than the error tolerance, it is an indication that the generation of the lookup table is feasible. Conversely, if at least one of the error values exceeds the error tolerance, the generation of the lookup table is infeasible.

The feasibility analyzer and lookup table generator 402 may generate a lookup table 412 based on the inputs 404, 406, and 408. The lookup table 412 may contain the breakpoints and table values that are selected as described below. The lookup table 412 in some instances may conform with the error tolerance with some inputs 404, 406, and 408 and may not conform with the error tolerance in other instances of 404, 406, and/or 408. The feasibility analyzer and lookup table generator 402 may also output a visualization 414 to provide useful information to the user.

In order to build the lookup table 412, exemplary embodiments may attempt to assign breakpoints and then assign table values for those breakpoints. At various points in the process of attempting to build the lookup table a determination may be made that it is not feasible to generate a lookup table that conforms with the error constraint (i.e., the error tolerance). The process of attempting to build the lookup table may stop once it is determined that it is not feasible and a feasibility indication 410 that indicates the infeasibility may be output.

Figure 5:
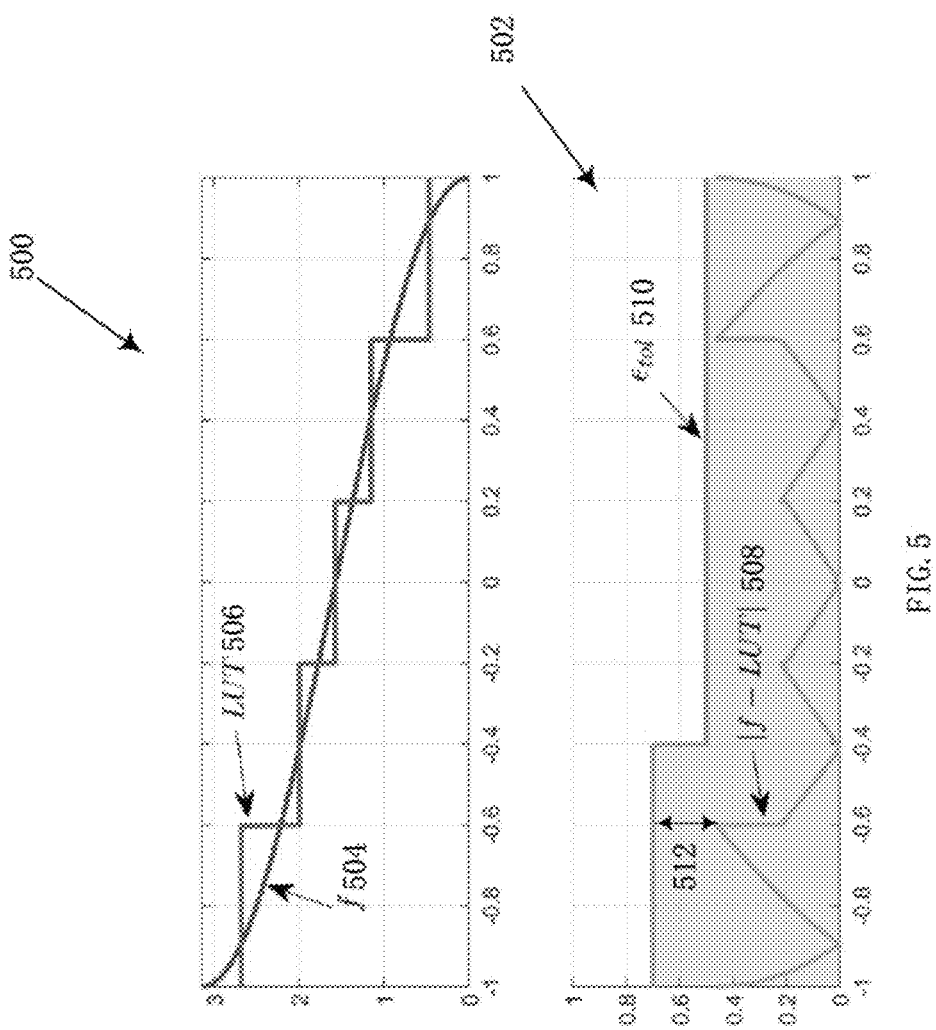
FIG. 5 depicts an example of a visualization that may be produced by an exemplary embodiment.

FIG. 5 depicts an example of the variety of information that may be output as part of the visualization 414. The visualization 414 may include plot 500 and/or plot 502. Plot 500 displays a curve 504 of output values for the function $f(x)$ across inputs. The vertical axis is for the values of the outputs, and the horizontal axis is the values of the inputs. The plot 500 also shows a curve 506 of the lookup table value outputs across inputs. The horizontally extending flat portions of the curve 506 reflect the flat interpolation between breakpoints. It is worth noting that the breakpoints are evenly spaced in this example but would not be in the exemplary embodiments.

Plot 502 includes a curve 508 for the magnitude of error between the function $f(x)$ and the output of the lookup table (LUT) across input values (i.e., values of x). The vertical axis is for the magnitude of the error, and the horizontal axis is for the input values. The plot 502 also shows a curve 510 of the error tolerance across input values. As can be seen for some input values, the error approaches the error tolerance, whereas for some input values the error is substantially less than the error tolerance. The plot 502 may be useful to a user. The plot 502 shows which input values have the most error and which input values have the least error. The plot 502 also depicts the margin 512 between the error 508 and the error tolerance 510. If the error value for no input is larger than the corresponding error tolerance value, generation of a lookup table conforming with the error tolerance is feasible. If not, generation of a lookup table conforming with the error tolerance is not feasible given the inputs that specify parameters for the lookup table. Note that although the breakpoints show in FIG. 5 are evenly distributed across the interval −1 to 1 with a gap of 0.2, in general, the generated lookup table can and likely will possess unevenly distributed breakpoints.

In exemplary embodiments, breakpoints may be determined so as to minimize the number of breakpoints and hence minimize the amount of memory required to store the lookup table. The approach detailed herein is certain to choose the minimum number of breakpoints that define intervals that conform with the error tolerance. In some embodiments, the breakpoints need not be set at the optimal positions and the number of breakpoints need not be set at the minimum. Instead, the breakpoint positions may be set close the optimal positions, and the number of breakpoints may be set close to the minimum number. The reduction of the memory requirements of the lookup table may result in substantial speed improvements when the lookup table is used.

Figure 6:
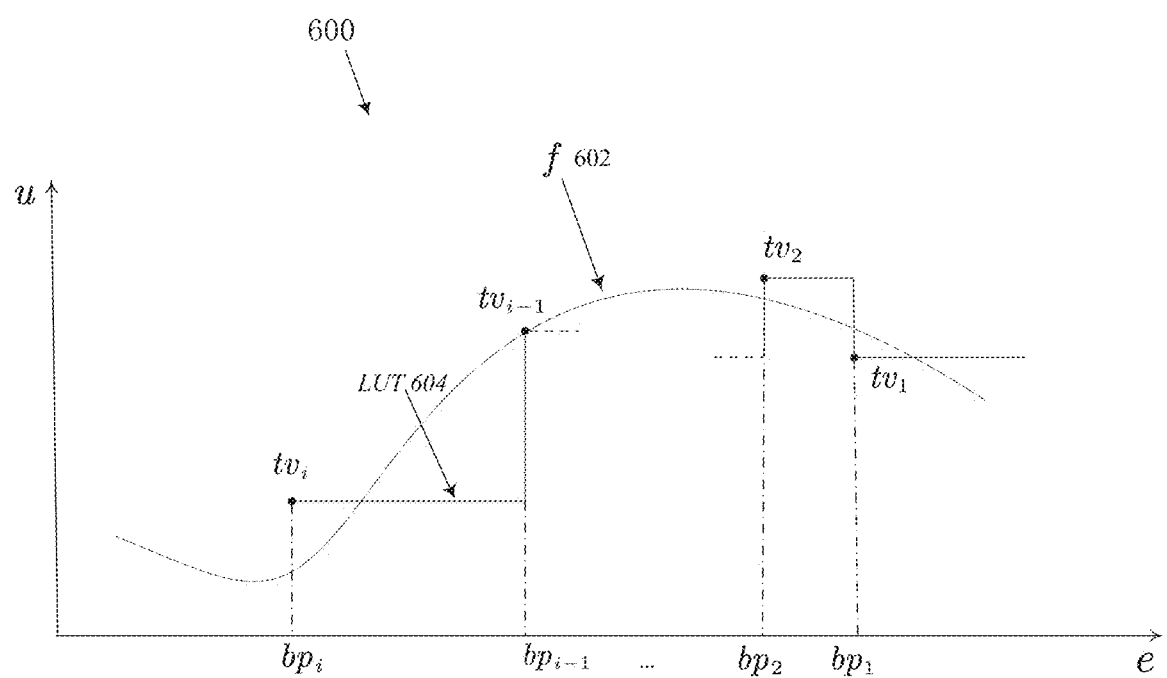
FIG. 6 depicts an illustrative plot of a function f(x), lookup table values, and breakpoints.

FIG. 6 depicts an example plot 600 that helps to illustrate selection of breakpoint locations and table values in exemplary embodiments. The horizontal axis is for input values of the lookup table and of function $f(x)$. The vertical axis is for values of the function $f(x)$ and the lookup table output values. The assignment of breakpoints may progress from highest input value positions to smallest input value positions in the depicted plot 600. Hence, the breakpoint with the position having the largest input value of the lookup table $bp_1$ may be assigned first, and then the breakpoint $bp_2$ may be assigned. The remaining breakpoints may be assigned moving from higher input value positions to lower input value positions. For each interval between successive breakpoints, all of the test points in the interval must satisfy the error tolerance (i.e., the lookup table output value for each test point must not differ from the corresponding function $f(x)$ value at the test point x more than the error tolerance at x). The approach is to select the breakpoint candidate with a smallest breakpoint candidate position relative to the most recently established breakpoint such that all of the test points in the interval between the selected breakpoint candidate and the most recently established breakpoint conform with the error constraint. As used herein, test points are input values or a subset of the input values if the number of input values is large or infinite. FIG. 6 shows the curve 602 for the function $f(x)$ and the LUT values 604 for the breakpoints. Hence, per the approach described herein, after breakpoint $bp_1$ is established, for the interval between $bp_2$ and $bp_1$, the breakpoint $bp_2$ is at the breakpoint candidate location that has a position at a smallest breakpoint candidate among the breakpoint candidates where the error constraint is satisfied for the test points in the interval that extends from $bp_2$ to the most recently established breakpoint $bp_1$.

Figure 7:
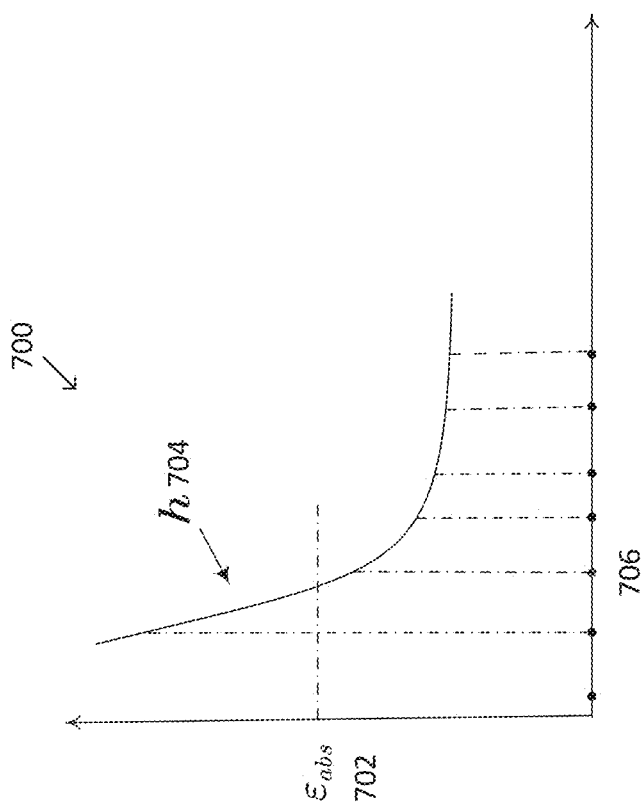
FIG. 7 depicts a plot of a function h and an error threshold.

FIG. 7 depicts a plot 700 of a function h, where $h(bp_i) \triangleq \min_{tv_i} e(bp_i, tv_i)$, where $e(bp_i, tv_i)$ is the error value between $bp_i$ and $bp_{(i-1)}$ if the table value of $bp_i$ is chosen as $tv_i$. In FIG. 7, each dot in the horizontal axis refers to a breakpoint candidate. The horizontal axis is e, and the vertical axis is u. For the case of understanding, in FIG. 7, we assume that the error tolerance function is constant and denoted its constant value as $\varepsilon_{abs}$. The dot denoted as 706 refers to the selected breakpoint candidate, since it possesses the smallest value among all breakpoint candidates such that the function h's value evaluated at this dot is no bigger than $\varepsilon_{abs}$.

The function h is monotonically decreasing. This can be seen in the curve 704 for h. The error threshold 702 is also shown. In this example, location 706 would be chosen for the breakpoint $bp_i$.

It is helpful to define some terms in order to explain in more detail how the breakpoints are determined in exemplary embodiments. For simplicity, a one-dimensional lookup table is considered here. Denote $\tau \triangleq (\tau_1, \tau_2, \ldots, \tau_n) \in \mathbb{R}^n$ as the breakpoint sequence, where $\tau_1 > \tau_2 > \ldots > \tau_n \in \mathbb{R}$. Let $y \triangleq (y_1, y_2, \ldots, y_n) \in \mathbb{R}^n$ be the corresponding table value sequence. Define $t_p \triangleq (tp_1, tp_2, \ldots, tp_m) \in \mathbb{R}^m$ as the test point sequence, where $tp_1 > tp_2 > \ldots > tp_m$. The discussion herein may interchangeably use $\tau_i$ and $bp_i$ to refer to the ith breakpoint, and use $y_i$ and $tv_i$ to refer to the ith table value. The collection of test points is a subset of all possible input values, and the discussion below details using test points to calibrate the approximate gap between lookup table's output and the function $f(x)$'s output. The the reason for using test points as opposed to input values for calibration is set forth below. Given a function f: $\mathbb{R} \to \mathbb{R}$, $\varepsilon_{abs}$ as a positive number representing the approximation gap measured by an absolute magnitude, and $\varepsilon_{rel}$ as a positive number representing the approximation gap measured by a relative magnitude with respect to the magnitude of f(x), denote the error function, for example, as $$e^{integ}(x) \triangleq \max\{\varepsilon_{abs}, \varepsilon_{rel}|f(x)|\}, \forall x \in \mathbb{R}.$$

It should be appreciated that the error function may be an arbitrary function and that the specified error function $e^{integ}(x)$ is intended to be merely illustrative.

The approach described herein assumes that flat interpolation is used with the lookup table, but other zero-order interpolation methods may be used instead.

Given T and y, denote its flat interpolation as $$LUT(x, y, \tau) = \begin{cases} y_1 & \text{if } x \geq \tau_1, \\ y_i + 1 & \text{if } \tau_{i+1} \leq x < \tau_i, \forall i \in [1, n-1]\mathbb{N}, \\ y_n & \text{if } x < \tau_n. \end{cases}$$

With respect to quantization, denote $T \subseteq \mathbb{R}$ and $Y \subseteq \mathbb{R}$ as the collection of candidate points from which t and y can choose from, respectively. The discussion below refers to points in T as breakpoint candidates, and points in Y as table value candidates. For instance, if T=R, then one can arbitrarily allocate breakpoints to any real-value positions. $\tau$ (resp. y)

is admissible if $\tau_n < \tau_{n-1} < \ldots < \tau_1$ and $\tau_i \in T$ for every $i \in [1,n]_N$ (resp. $y_i \in Y$ for every $i \in [1,n]_N$) where $[1,n]_N$ refers all integers from 1 to n, including 1 and n. Typically T is a finite set and denotes its cardinality as q.

The problem solved by the exemplary embodiments may be defined as finding the minimum number of breakpoints n. This problem can be formulated as the following optimization problem denoted as (P1).

(P1) $\min_{\tau,y,n} n$
s.t. $|f(x) - \text{LUT}(x,y,t)| \le e^{integ}(x)$, $\forall x \in tp$,
$\tau_i \in T$, $\forall i \in [1,n]_N$,
$\tau_1 > \tau_2 > \ldots > \tau_n$,
$y_i \in Y$, $\forall i \in [1,n]_N$,
$n \ge 2$,
$n \in N$.

Note that the first constraint should hold true for every x in the test point sequence denoted as tp. Although ideally the constraint should hold true for all input values, due to the possibility that input values may consists of infinitely-many values, here the discussion uses tp, a finite subset of input values, to evaluate the gap between $f(x)$ and lookup table's output. Since input values do not directly appear in this optimization problem (P1), for simplicity, throughout the entire discussion, it is assumed that the input values are all real numbers in an interval, but the way we construct lookup table does not rely on such an assumption.

Define the following function:

$$e_{right}(\tau^{cur}, y^{cur}) \triangleq \max_{x \in tp, x \in [\tau^{cur}, \infty)} \{|f(x) - y^{cur}| - e^{integ}(x)\}, \forall \tau^{cur} \in T, \forall y^{cur} \in Y,$$

$$e_{middle}(\tau^{cur}, y^{cur}, \tau^{pre}) \triangleq \max_{x \in tp, x \in [\tau^{cur}, \tau^{pre})} \{|f(x) - y^{cur}| - e^{integ}(x)\},$$

$$\forall \tau^{cur}, \tau^{pre} \in T \text{ and } \tau^{pre},$$

$$e_{left}(\tau^{cur}, y^{cur}) \triangleq \max_{x \in tp, x \in (-\infty, \tau^{cur})} \{|f(x) - y^{cur}| - e^{integ}(x)\}, \forall \tau \in T, \forall y^{cur} Y.$$

In addition, $T_{right} \triangleq \{\tau^{cur} \in T | \exists y^{cur} \in Y \text{ s.t. } e_{right}(\tau^{cur}, y^{cur}) \le 0\}$, $T_{middle}(\tau^{pre}) \triangleq \{\tau^{cur} \in T | \tau_{cur} < \tau_{pre}$ and $\exists y^{cur} \in Y \text{ s.t. } e_{middle}(\tau^{cur}, y^{cur}) \le 0\}, \forall \tau^{pre} \in T.$ A suitable approach for assigning breakpoints, table values and determining feasibility is as follows:

---
Algorithm 1:
---

Data: tp, f, $e^{integ}$, T, Y
Result: An optimal solution $(n^*, T^*, y^*)$ of (P1), or an indication that (P1) is infeasible
1   Initialization: $i \leftarrow 1$
2   if $T_{right} = \emptyset$ then
3   |   The problem is infeasible
4   |   Return
5   end
6   $\tau_1^* \leftarrow \min T_{right}$
7   $y_1^* \leftarrow \arg\min_{y^{cur} \in Y} e_{right}(\tau_1^*, y^{cur})$
8   if $e_{right}(\tau_1^*, y_1^*) \le 0$ then
9   |   $n^* \leftarrow 2, y_2^* \leftarrow y_1^*$
10   |   Choose any $\tau_1^*$ and $\tau_2^*$ in T, with $\tau_1^* < \tau_2^*$
11   |   Return
12   end
13   while $e_{left}(\tau_1^*, y_1^*) > 0$ do
14   |   if $T_{middle}(\tau_{i-1}^*) = \emptyset$ then ---
Algorithm 1:
---

15   |   |   The problem is infeasible
16   |   |   Return
17   |   end
18   |   $i \leftarrow i + 1$
19   |   $\tau_i^* \leftarrow \min T_{middle}(\tau_{i-1}^*)$
20   |   $y_i^* \leftarrow \arg\min_{y^{cur} \in Y} e_{middle}(\tau_i^*, y^{cur}, \tau_{i-1}^*)$
21   end
22   $n^* \leftarrow i$
23   Return Algorithm 1 above does not clearly explain how to efficiently implement steps 6, 7, 19, and 20. To do so, one may first define:

$$\overline{h}_{middle}(\tau^{cur}, \tau^{pre}) \triangleq \max_{x \in tp, x \in [\tau^{cur}, \tau^{pre})} \{f(x) - e^{integ}(x)\},$$

$$\underline{h}_{middle}(\tau^{cur}, \tau^{pre}) \triangleq \max_{x \in tp, x \in [\tau^{cur}, \tau^{pre})} \{f(x) - e^{integ}(x)\},$$

$$\overline{h}_{right}(\tau^{cur}) \triangleq \max_{x \in tp, x \in [\tau^{cur}, +\infty)} \{f(x) - e^{integ}(x)\},$$

$$\underline{h}_{right}(\tau^{cur}) \triangleq \min_{x \in tp, x \in [\tau^{cur}, +\infty)} \{f(x) - e^{integ}(x)\}.$$

$$y^*_{middle}(\tau^{cur}, \tau^{pre}) \triangleq Q\left(\frac{\overline{h}_{middle}(\tau^{cur}, \tau^{pre}) + \underline{h}_{middle}(\tau^{cur}, \tau^{pre})}{2}, Y\right),$$

$$\forall \tau^{cur}, \tau^{pre} \in T \text{ with } \tau^{cur} < \tau^{pre},$$

$$y^*_{right}(\tau^{cur}) \triangleq Q\left(\frac{\overline{h}_{right}(\tau^{cur}) + \underline{h}_{right}(\tau^{cur})}{2}, Y\right), \forall \tau^{cur} \in T$$

$$w_{middle}(\tau^{cur}, \tau^{pre}) \triangleq \max$$

$$\{\overline{h}_{middle}(\tau^{cur}, \tau^{pre}) - y^*_{middle}(\tau^{cur}, \tau^{pre}), y^*_{middle}(\tau^{cur}, \tau^{pre}) - \underline{h}_{middle}(\tau^{cur}, \tau^{pre})\},$$

$$w_{right}(\tau^{cur}) \triangleq \max\{\overline{h}_{right}(\tau^{cur}) - y^*_{right}(\tau^{cur}), y^*_{right}(\tau^{cur}) - \underline{h}_{right}(\tau^{cur})\},$$

$$\forall \tau^{cur} \in T$$

where $Q(x, Y)$ outputs the quantized value of x with respect to the set Y.

Based on the above notation, it is provable that $$y^*_{right}(\tau^{cur}) \in \arg\min_{y^{cur} \in Y} e_{right}(\tau^{cur}, y^{cur}), \forall \tau^{cur} \in T,$$

$$y^*_{middle}(\tau^{cur}, \tau^{pre}) \in \arg\min_{y^{cur} \in Y} e_{middle}(\tau^{cur}, y^{cur}, \tau^{pre}),$$

$$\forall \tau^{cur}, \tau^{pre} \in T \text{ with}$$

$$\tau^{cur} < \tau^{pre} \min_{y^{cur} \in Y} e_{right}(\tau^{cur}, y^{cur}) = w_{right}(\tau^{cur}), \forall \tau^{cur} \in T,$$

$$\min_{y^{cur} \in Y} e_{middle}(\tau^{cur}, y^{cur}, \tau^{pre}), \forall \tau^{cur} \tau^{pre} \in T \text{ with } \tau^{cur} < \tau^{pre}.$$

$$T_{right} \triangleq \{\tau^{cur} \in T | w_{right}(\tau^{cur}) \le 0\},$$

$$T_{middle}(\tau^{pre}) \triangleq \{\tau^{cur} \in T | \tau_{cur} < \tau_{pre} \text{ and } w_{middle}(\tau^{pre}, \tau^{cur}) \le 0\}, \forall \tau^{pre} \in T.$$

With these mathematical conclusion, Algorithm 1 can be implemented in a more efficient fashion as shown in Algorithm 3, Algorithm 3:

Data: tp, f, $e^{integ}$, T, Y
Result: An optimal solution $(n^*, \tau^*, y^*)$ of (P1), or an indication
that (P1) is infeasible
1  Initialization: $i \leftarrow 1$
2  Run Algorithm 2 for $T_{right}$ case and obtain (flag$_\theta$, bp$^{bsz}$, y$^{bsz}$)
3  if flag$_\theta$ then
4     The problem is infeasible
5     Return
6  end
7  $\tau_1^* \leftarrow \tau^{bsz}$
8  $y_1^* \leftarrow y^{bsz}$
9  if $e_{left}(\tau_1^*, y_1^*) \leq 0$ then
10    $n^* \leftarrow 2, y_2^* \leftarrow y_1^*$
11    Choose any $\tau_1^*$ and $\tau_2^*$ in T, with $\tau_1^* < \tau_2^*$
12    Return
13 end
14 while $e_{left}(\tau_1^*, \tau_y^*) > 0$ do
15    Run Algorithm 2 for $T_{middle}(\tau_{i-1}^*)$ case and obtain
      (flag$_\theta$, bp$^{bsz}$, y$^{bsz}$)
16    if flag$_\theta$ then
17       The problem is infeasible
18       Return
19    end
20    $i \leftarrow i + 1$
21    $\tau_1^* \leftarrow \tau^{bsz}$
22    $y_1^* \leftarrow y^{bsz}$
23 end
24 $n^* \leftarrow i$
25 Return $(n^*, \tau^*, y^*)$ where Algorithm 2 mentioned in steps 2 and 15 is Algorithm 2: binary search + ZOES Result: An empty set flag flag$_\theta$ for $T_{right}$ (resp. $T_{middle}(\tau_{i-1}^*)$), and a pair
   of breakpoint and table value $\tau^{bsz}$, y$^{bsz}$ if feasible
1  Input: $T_{right}$ case or $T_{middle}(\tau_{i-1}^*)$ case
2  Initialization: flag$_\theta \leftarrow$ false, $\tau^{bsz} \leftarrow 0$, y$^{bsz} \leftarrow 0$
3           for $T_{right}$: high $\leftarrow q$,
4           for $T_{middle}(\tau_{i-1}^*)$: If $t_1 \geq \tau_{i-1}^*$, flag$_\theta \leftarrow$ true. Return. Otherwise
high $\leftarrow \max_j t_j < \tau_{i-1}^*$.

5  low $\leftarrow 1$, 6  guess $\leftarrow \left\lceil \dfrac{low + high}{2} \right\rceil$ 7  if tp $\cap [t_{high}, \infty) \neq \theta$ and $w_{right}(t_{high}) > 0$ (resp. tp $\cap [t_{high}, \tau_{i-1}^*.) \neq \theta$ and $w_{middle}(\tau_{guess}, \tau_{i-1}^*.) > 0$) then
8  |  flag$_\theta \leftarrow$ true
9  |  Return
10 end
11 while low + 1 < high do
12 |  if tp $\cap [t_{high}, \infty) = 0$ and $w_{right}(t_{high}) > 0$ (resp. tp $\cap [t_{high},$
   |  $\tau_{i-1}^*.) \neq 0$) then
13 |  |  cost $= -\infty$
14 |  else
15 |  |  cost $= w_1(t_{guess})$(resp. cost $= w_{middle}(\tau_{guess}, \tau_{i-1}^*.))$
16 |  end
17 |  if cost > 0 then
18 |  |  low $\leftarrow$ guess
19 |  else
20 |  |  high $\leftarrow$ guess
21 |  end 22 |  guess $= \left\lceil \dfrac{low + high}{2} \right\rceil$ 23 end
24 if tp $\cap [t_{low}, \infty) = \theta$ then
25 |   $\tau^{bsz} \leftarrow t_{low}$, y$^{bsz} \leftarrow$ any element in Y
26 |  else if $w_1(t_{low}) < 0$ then
27 |  |  $\tau^{bsz} \leftarrow t_{low}$, y$^{bsz} \leftarrow y_{right}^*(t_{low})$(resp. $y_{middle}^*(t_{low}, \tau_{i-1}^*.))$ Algorithm 2: binary search + ZOES 28 |  else if tp $\cap [t_{high}, \infty) = \theta$ then
29 |  |  $\tau^{bsz} \leftarrow t_{high}$, y$^{bsz} \leftarrow$ any element in Y
30 |  else
31 |  |  $\tau^{bsz} \leftarrow t_{high}, y_1^*(t_{high})$(resp. $y_{middle}^*(t_{high}, \tau_{i-1}^*.))$
32 end
33 Return (flag$_\theta$, bp$^{bsz}$, y$^{bsz}$)

Figure 8:
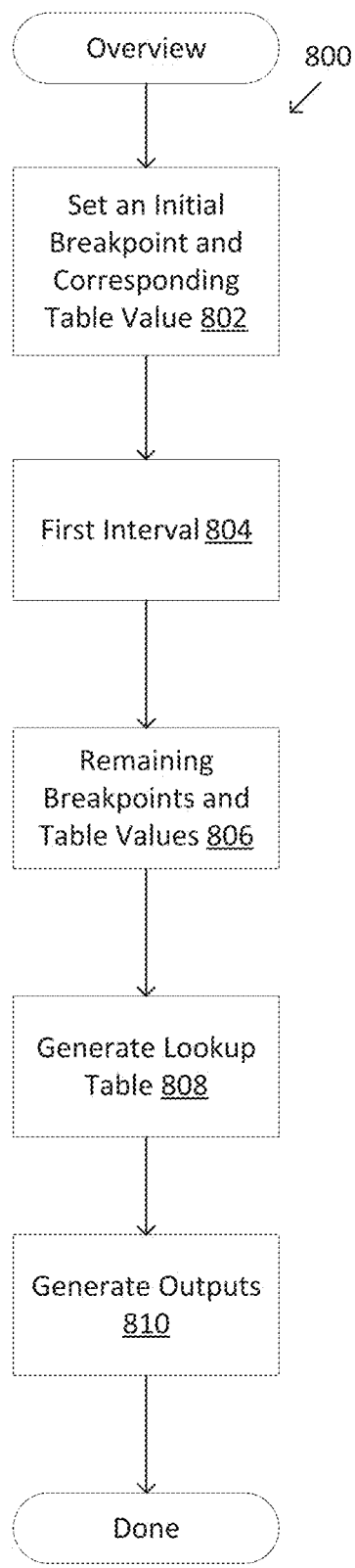
FIG. 8 depicts a flowchart of illustrative steps that may be performed in exemplary embodiments to attempt to assign breakpoints and table values.

FIG. 8 depicts a flowchart 800 of illustrative steps that may be performed in exemplary embodiments to attempt to determine breakpoints and table values for the lookup table and to assign table values consistent with the approach set forth above. At 802, an initial breakpoint is set from the breakpoint candidates and a corresponding table value is set for the breakpoint. The breakpoint candidates may be specified by the user or by the data types of the input values for the lookup table. The data type has an associated granularity that results from the computer representation of the data type.

Figure 9:
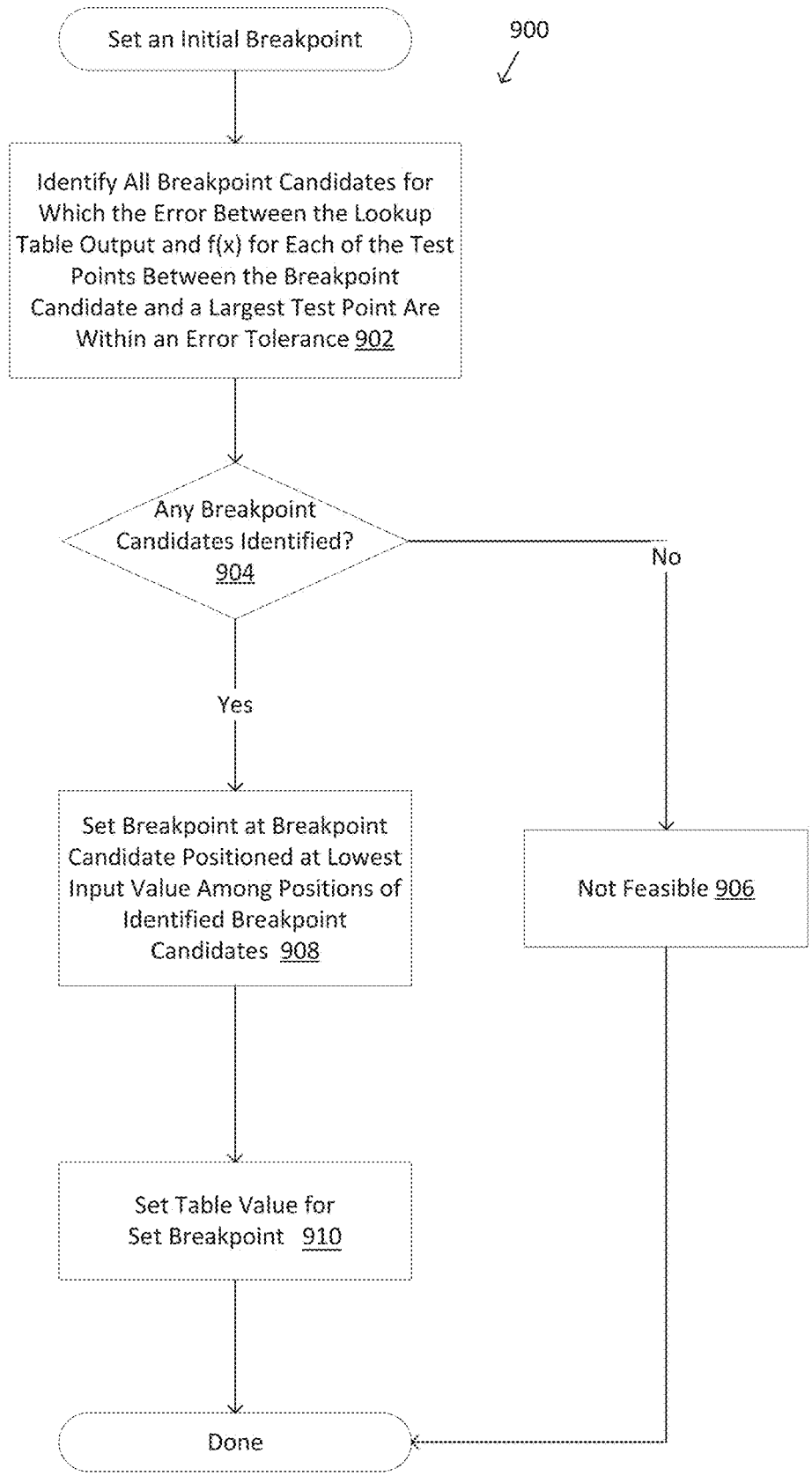
FIG. 9 depicts a flowchart of illustrative steps that may be performed in exemplary embodiments to attempt to establish an initial breakpoint.

FIG. 9 depicts a flowchart 900 of illustrative steps that may be performed in exemplary embodiments as part of 802 and 806 (described below). Initially, at 902, breakpoint candidates are identified for which the error between the lookup table output value and $f(x)$ for each of the test points between the breakpoint candidate and a largest test point are within an error tolerance. FIG. 10A depicts an example plot 1000 of the function $f(x)$ 1002 and a portion of the LUT values 1004. FIG. 10A also depicts test points $tp_1$, $tp_2$, $tp_3$, ..., $tp_m$, breakpoints $bp_1$ and $bp_2$, and breakpoint candidates $bpc_1$, $bpc_2$ and so forth until the last breakpoint $bpcz$. The process can start with $bpc_1$ and try successive breakpoint candidates (e.g., $bpc_2$, $bpc_3$, etc.) to identify those for which the error between the lookup table output value and $f(x)$ for each of the test points between the breakpoint candidate and a largest test point are within an error tolerance. In the example of FIG. 10A, $bpc_1$ and $bpc_2$ are the breakpoint candidates that are identified at 902.

At 904, a check is made whether any breakpoint candidates were identified at 902. If not, it is not feasible to generate the lookup table, and at 906, an output indication of the infeasibility may be generated. At 908, if there are identified breakpoint candidates, the breakpoint candidate that is at a smallest input value position among the positions of the identified breakpoint candidates is chosen as the breakpoint. In FIG. 10A, breakpoint candidate $bpcz$ is chosen. A table value may then be set for the chosen breakpoint at 910, as described above.

Figure 10B:
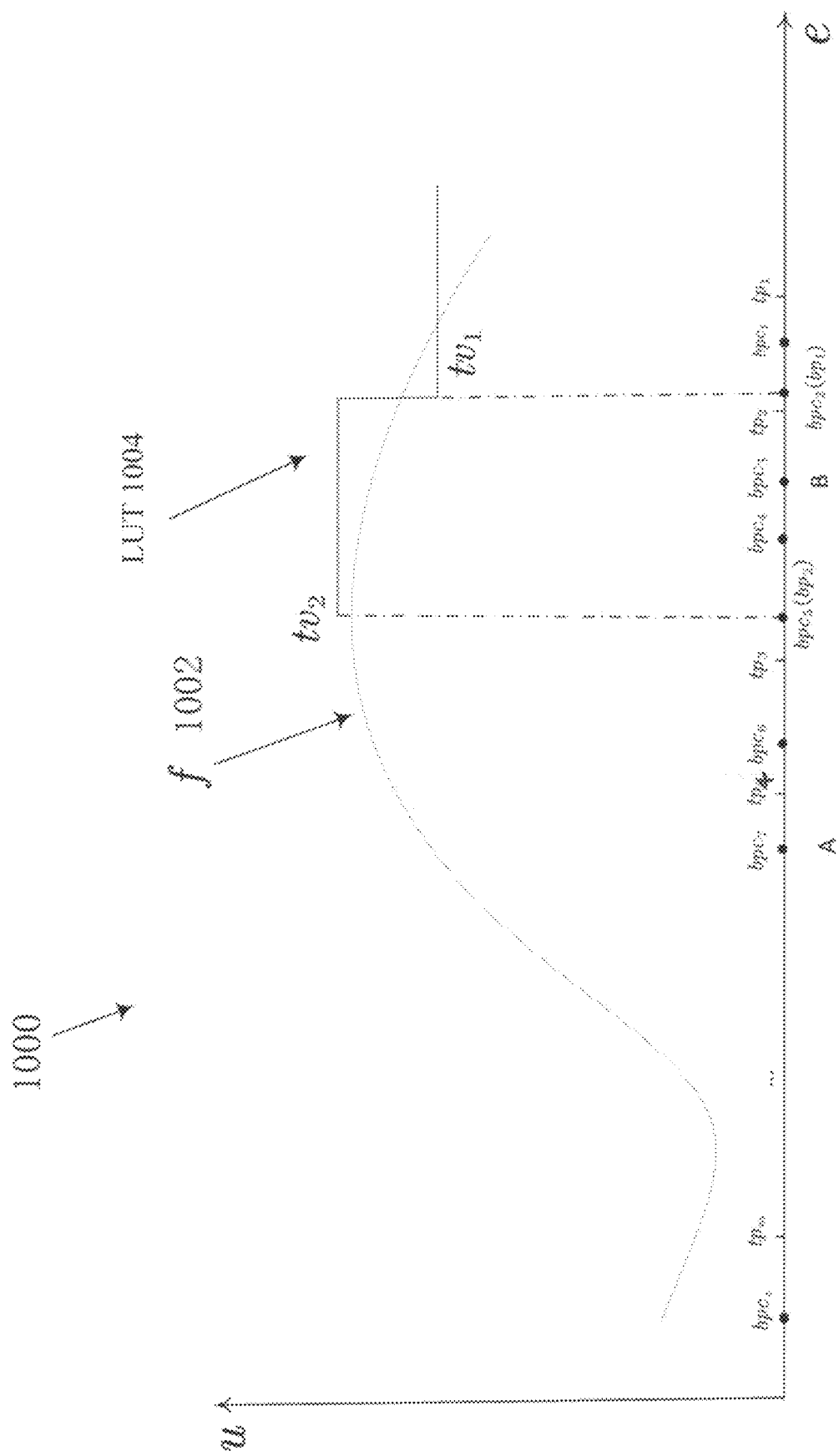
FIG. 10B depicts an exemplary plot to illustrate a binary search.

This search for breakpoint candidates for which the error constraint is satisfied for the interval may be conducted using a binary search. Thus, as shown in FIG. 10B, a breakpoint candidate A that is positioned at a median position among the positions of the breakpoint candidates (assuming 13 breakpoint candidates) may be examined. If that breakpoint candidate does not work, the next breakpoint candidate at B, halfway in the sequence of breakpoint candidates between the previous candidate A and the initial breakpoint $bp_1$ may be chosen. In general, the binary search process excludes half of the remaining breakpoint candidates in each iteration, and stops when there is only one remaining breakpoint candidate.

Figure 11:
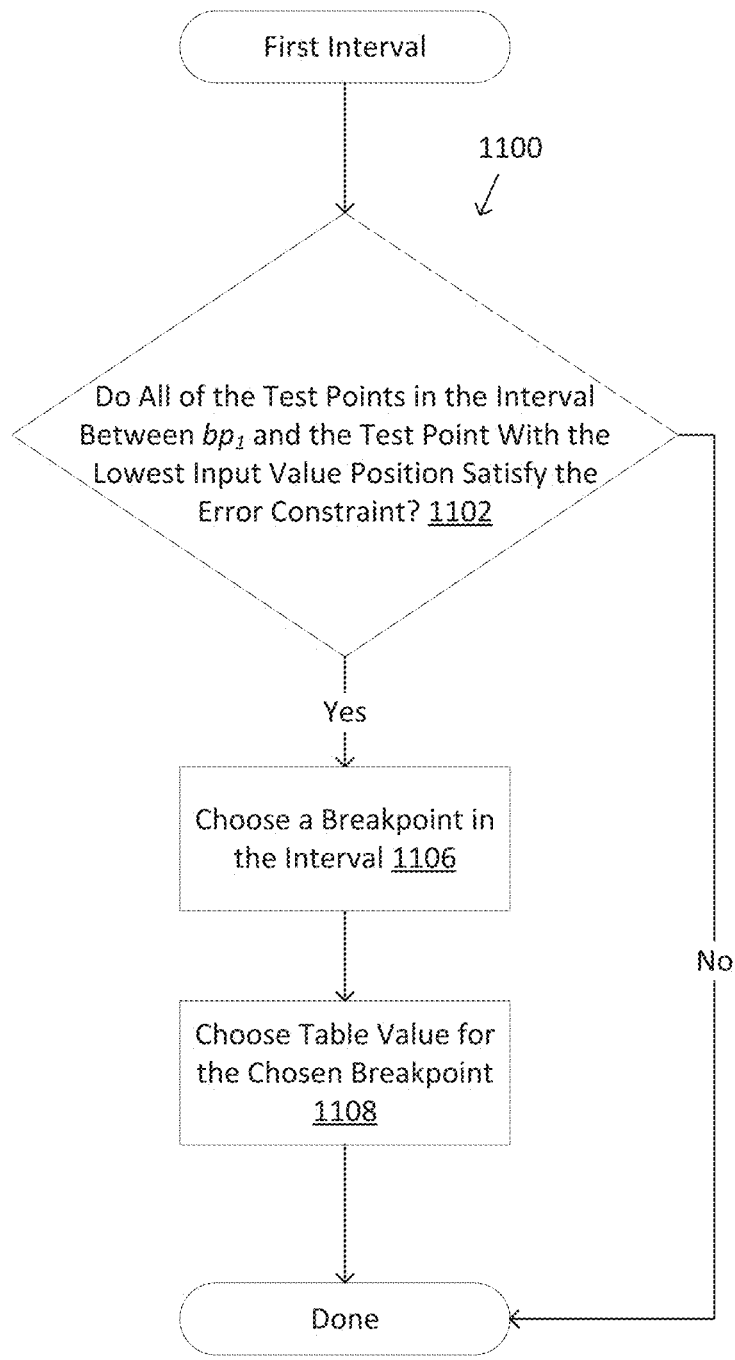
FIG. 11 depicts a flowchart of illustrative steps that may be performed in exemplary embodiments to perform first interval processing.

With reference to FIG. 8, at 804 processing for a first interval may then be performed at 804. The first interval is the interval between $bp_1$ and $tp_1$. FIG. 11 depicts a flowchart 1100 of illustrative steps that may be performed as part of 804 in exemplary embodiments. At 1102, a check is performed. In particular, a check is made of whether all of the test points in the interval between the initial breakpoint that has been set (e.g., $bp_1$) and the test point with the smallest input value position (e.g., $tp_m$) satisfy the error constraint. If not, the remaining breakpoints and table values processing is performed at 806 as will be detailed below. If the check at 1102 is satisfied, the entire lookup table will satisfy the error constraint so at 1106 any breakpoint in the interval is chosen. At 1108, a table value for the selected breakpoint is chosen.

Figure 12:
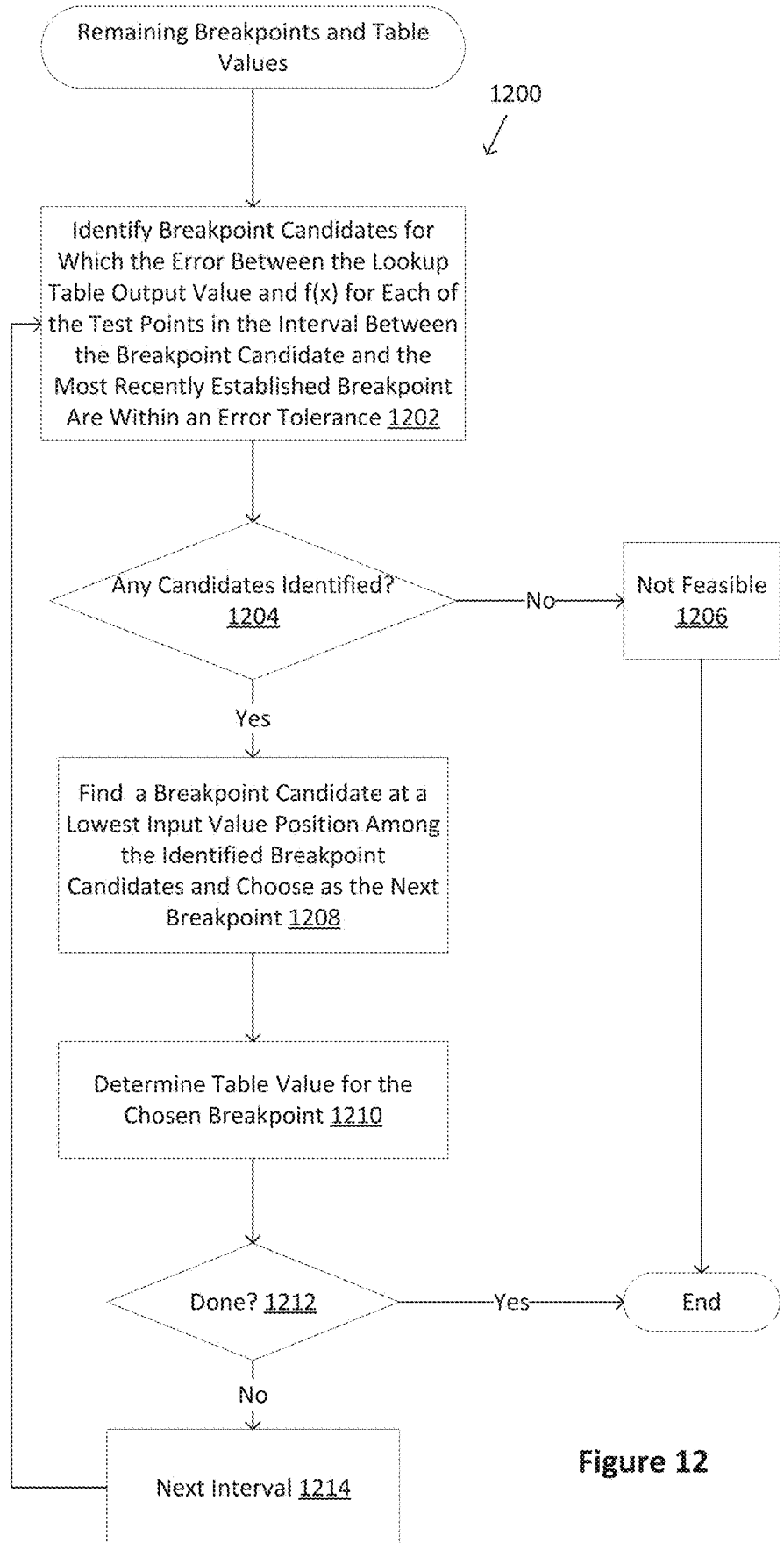
FIG. 12 depicts a flowchart of illustrative steps that may be performed in exemplary embodiments to perform remaining breakpoints and table values processing.

At 806, the remaining breakpoints and table values processing is performed to establish the remaining breakpoints for the lookup table and the associated table values at the breakpoints. FIG. 12 depicts a flowchart 1200 of illustrative steps that may be performed as part of this processing. The steps are performed iteratively until all the breakpoints and table values are established or until it is determined that it is not feasible to generate the lookup table. At 1202, breakpoint candidates are identified for which the error between the lookup table output value and $f(x)$ for each of the test point in the interval between the breakpoint candidate and the most recently established breakpoint is within the error constraint. The breakpoint candidates being considered are those between the most recently established breakpoint and the breakpoint candidate with a smallest input value position among the breakpoint candidates. This process may be performed using a binary search to identify the breakpoint candidates in 1202. At 1204, a check is made whether any breakpoint candidates are identified in 1202. If not, at 1206, it is determined that it is not feasible to generate the lookup table, and the feasibility indication 410 may be output to indicate the infeasibility. If so, at 1208, the breakpoint candidate with a smallest input value position among the identified breakpoint candidates is found and that breakpoint candidate is set as the next breakpoint. At 1210, a table value for the newly established breakpoint is determined. At 1212, a check is made whether the process is done. The process is done when the breakpoint smallest input value position among the breakpoints is established such that all of the test points between that breakpoint and the last test point satisfy the error constraint. If the check indicates that the processing is not done, the processing repeats for the next interval beginning at 1202.

As shown in FIG. 8, if the process has not stopped due to the generation of the lookup table being infeasible, at least a portion of the lookup table or the whole lookup table is generated at 808 with the determined breakpoints and table values. At 810, the outputs may be generated as shown in FIG. 4. The outputs may include the lookup table 412, visualization 414, and in some case, an explicit feasibility indication. In some instances, the generation of the lookup table serves as the feasibility indication.

Figure 13:
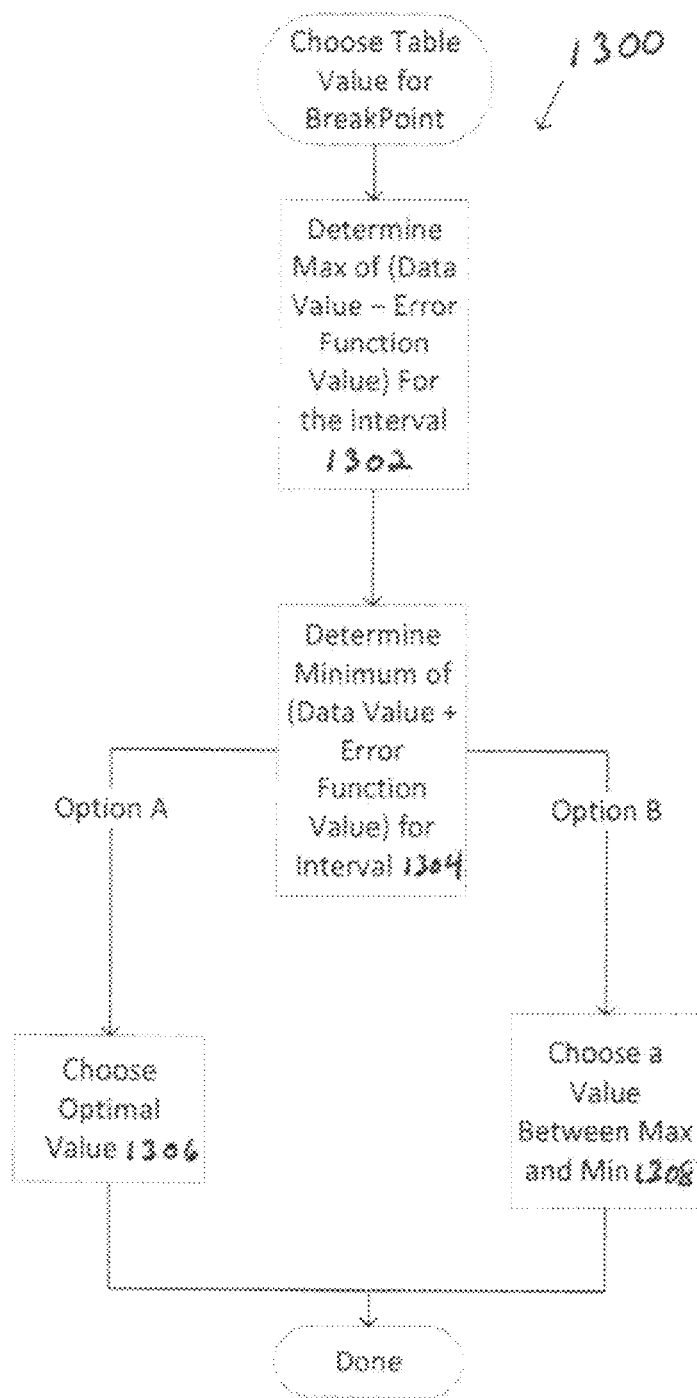
FIG. 13 depicts a flowchart of illustrative steps that may be performed in exemplary embodiments to determine a table value for a breakpoint.

Note that Algorithms outputs breakpoint $\tau^{bsz}$ and its corresponding table value $y^{bsz}$. The position of $\tau^{bsz}$ is fixed through the process of binary search mentioned above. As indicated in the flowchart 1300 of FIG. 13, at 1302, to determine $y^{bsz}$, for the interval between $\tau^{bsz}$. and its previous breakpoint, the maximum of (data values—error function values) is calculated. The data values are the y value of data points or the f(x) values at test points in the interval. The error function values represent the values of the error function evaluated at the test points in the interval. The specified maximum is determined over all the test points in the interval. At 1304, the minimum of (data values+error function values) is determined as well. At 1306, the table value $y^{bsz}$ that is optimal for the set of test points may then be chosen as the quantized value of half of the sum of maximum and minimum. This process of determining $y^{bsz}$ for $\tau^{bsz}$ is generalized to determining the table value associated with any breakpoint, and its related mathematical definitions are given by $y^*_{middle}$ and $y^*_{right}$ defined early in this application.

In alternative embodiments, an optimal table value is not needed. For example, merely a near-optimal table value or simply an acceptable value that will not exceed the error tolerance may be chosen. In such cases, at 1308, the feasibility analyzer may choose any possible value between the maximum and minimum discussed above. In some embodiments, this may involve reworking the formula for $y^{bsz}$, such as not dividing by 2 but dividing by 3 or by 2.2 or some other value. Alternatively, the values of the numerator in the above formula could be weighted such as multiplying one or both by a weight.

As mentioned above, table values are determined for each breakpoint. The approach described herein works for zero-order interpolation methods where $LUT(x,y,\tau)$ is a piecewise constant in y.

The feasible region is defined as $$\bar{\mathcal{F}} \triangleq \{y \in Rn \| f(x) - LUT(x,y) | \leq e^{integ}(x), \forall x \in tp \quad \text{and}$$
$$Q(y)=y\},$$

where $Q(y)$ denotes the quantized value of y with respect to the specified table value data type, and the expression $Q(y)=y$ means that the quantized value of y equals y (i.e., that y is representable in the specified table value data type).

Given the use of the zero-order interpolation herein, the approximation error in each interval $[\tau_i, \tau_{i+1})$ is only impacted by the table value for that interval $y_i$ and the test points lying between the interval. As such, it is independent of the approximation error in any other interval $[\tau_j, \tau_{j+1})$ with $j \neq i$. Therefore, minimizing the overall approximation error with respect to y is equivalent to individually minimizing the approximation error for each interval $[\tau_i, \tau_{i+1})$, where the decision variable is simply $y_i$.

Consistent with the discussion herein where interpolation is used to assign the table value of the breakpoint that possesses smaller value among the two breakpoints that specify an interval to all input values in the interval, exemplary embodiments may instead employ interpolation that assigns the table value of the breakpoint that possesses higher value to all input values in the interval.

The feasibility analyzer and lookup table generator 402 may be realized in computer programming instructions. For example, the feasibility analyzer and lookup table generator 402 may be realized in one or more computer programs, modules, routines, methods, objects, etc. The feasibility analyzer and lookup table generator 402 may be realized in an environment such as a model development environment, a model simulation environment, or a programming environment. The model may seek to generate a lookup table. An example of a programming environment is a technical computing environment like MATLAB® environment from The Math Works, Inc. of Natick Massachusetts. Exemplary simulation or modeling environments that may be used for the exemplary embodiments include the Simulink® model development environment from The Math Works, Inc. of Natick Massachusetts, the MATLAB® algorithm development environment from The MathWorks, Inc., as well as the Simscape™ physical modeling tool and the Stateflow® state chart tool also from The Math Works, Inc., the MapleSim physical modeling and simulation tool from Waterloo Maple Inc. of Waterloo, Ontario, Canada, the LabVIEW virtual instrument programming system and the NI MatrixX model-based design product both from National Instruments Corp.

of Austin, TX, the Visual Engineering Environment (VEE) from Keysight Technologies, Inc. of Santa Clara, CA, the System Studio model-based signal processing algorithm design and analysis tool and the SPW signal processing algorithm tool from Synopsys, Inc. of Mountain View, CA, a Unified Modeling Language (UML) system, a Systems Modeling Language (SysML) system, the System Generator system from Xilinx, Inc. of San Jose, CA, and the Rational Rhapsody Design Manager software from IBM Corp. of Somers, NY. Models created in the high-level simulation environment may contain less implementation detail, and thus operate at a higher level than certain programming languages, such as the C, C++, C#, and SystemC programming languages.

Figure 14A:
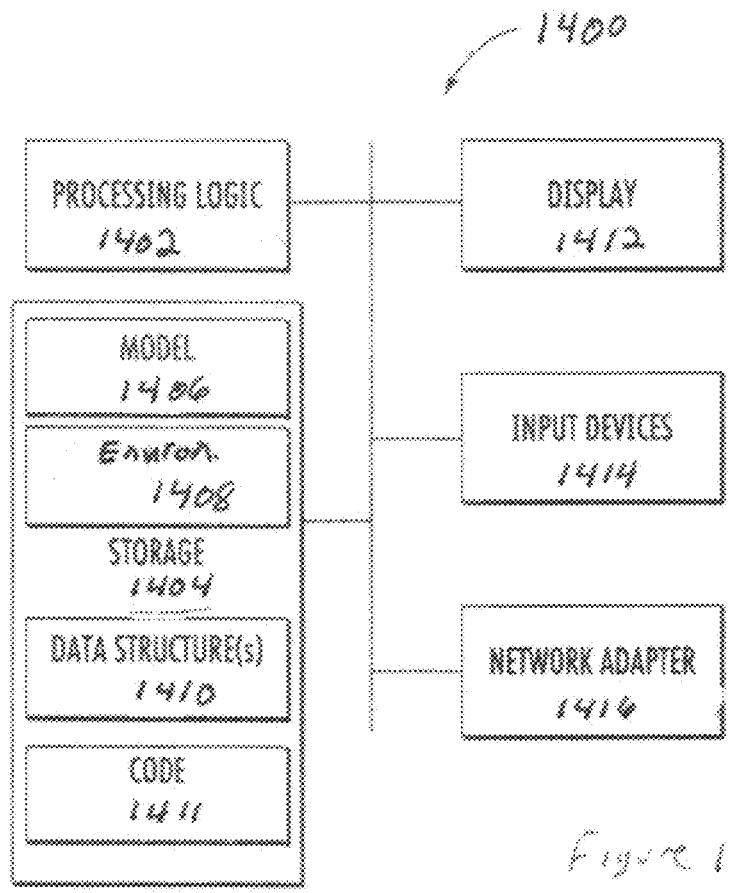
FIG. 14A depicts a block diagram of a computing device suitable for practicing an exemplary embodiment.

FIG. 14A depicts a block diagram of a computing environment 1400 suitable for practicing an exemplary embodiment. The computing environment 1400 may be a desktop computer, a laptop computer, a tablet computer, an embedded system, or other type of computing environment. The computing environment 1400 may include a processing logic 1402. The processing logic 1402 may be a central processing unit (CPU), a graphical processing unit (GPU), a field programmable gate array (FPGA), an application specific integrated circuit (ASIC), a controller, electronic circuitry, or a combination thereof. The processing logic 1402 may execute instructions to realize the functionality of the exemplary embodiments described herein. The programming language instructions may be written by a developer or may be generated from a model. Alternatively, the processing logic may be configurable by configuration settings to realize the functionality. The processing logic 1402 has access to a storage 1404. The storage 1404 may be a magnetic storage device, an optical storage device, or a combination thereof. The storage may include solid state storage, hard drives, removable storage elements such as magnetic disks, optical disks, thumb drives, or the like. The storage 1404 may include RAM, ROM, and other varieties of integrated circuit storage devices.

The storage 1404 may hold computer-executable instructions as well as data, documents, and the like. In FIG. 14A the storage 1404 is shown storing a simulatable or executable model 1406. The model 1406 may be a graphical model, a textual model, or a combination thereof. The storage 1404 may include a modeling/simulation environment 1408, such as has been described above. Environment 1408 may be a programming environment, a modeling environment, or a simulation environment, such as discussed above. The environment 1408 may simulate the model 1406, and the functionality described above for the exemplary embodiments may be realized as part of the environment 1408 and model 1406. The storage 1404 may also store the data structure(s) 1410 used for representing the data and/or functionality described above. The storage 1404 may store code 1411 (e.g., programming language instructions) for performing operations for the feasibility analyzer and lookup table generator described herein, or for other applications. The computing device 1400 may include a display device 1412 for displaying textual, graphical, or video output. Examples include LED displays, LCD displays, and retinal displays. The computing device 1400 may include input devices 1414 such as a keyboard, mouse, microphone, scanner, pointing device, or the like. The computing device 1400 may include a network adapter 1416 for interfacing the computing device with a network, such as a local area network or a network that provides access to a remote network like the Internet or another web-based network.

Figure 14B:
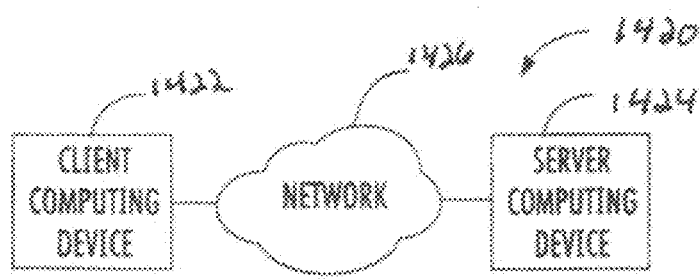
FIG. 14B depicts a block diagram of a distributed environment suitable for practicing an exemplary embodiment.

FIG. 14B depicts an illustrative distributed environment 1420 suitable for practicing exemplary embodiments. A client computing device 1422 is interfaced with a network 1426, such as a wide area network like the Internet, that is also interfaced with a server computing device 1424. The client computing device 1422 may include client code or a web browser for communicating with the server computing device 1424. For example, the programming environment or the model development or simulation environment may run on the server computing device and a client on the client computing device 1422 may request that server computing device 1424 simulate the model or run code and return the results. The server computing device 1424 may have a form like that shown in FIG. 14A. The client computing device 1422 may have components like those shown in FIG. 14A.

Figure 15:
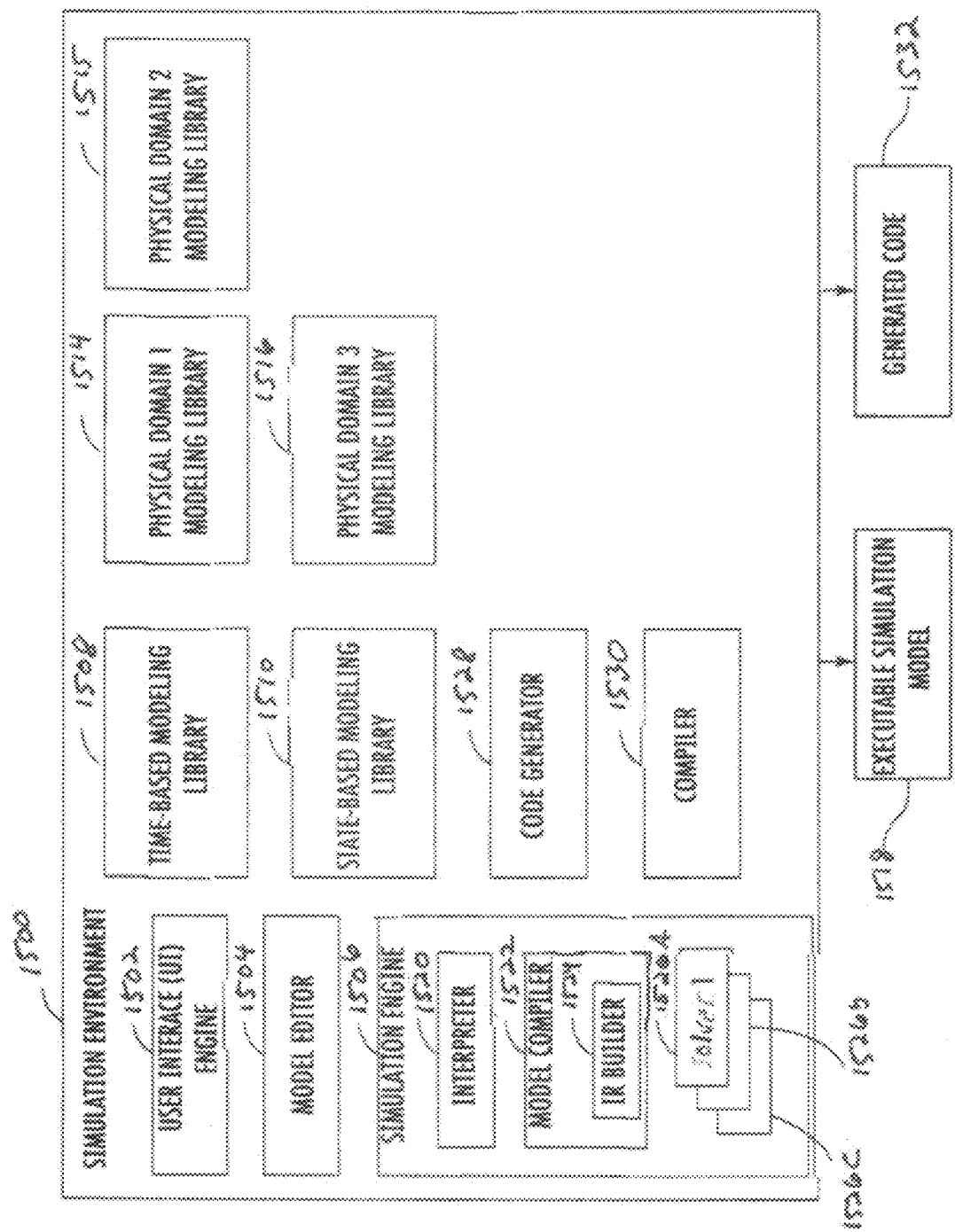
FIG. 15 depicts components of an illustrative simulation environment for an exemplary embodiment.

FIG. 15 is a partial functional diagram of an example simulation environment 1500 that may be used in some exemplary embodiments. The simulation environment 1500 may seek to generate a lookup table as part of the simulation of a model. The simulation environment 1500 may include a user interface (UI) engine 1502, a model editor 1504, a simulation engine 1506, and one or more data stores, such as libraries, that contain predefined model element types. For example, the simulation environment may include a time-based modeling library 1508, a state-based modeling library 1510, and/or one or more physical domain modeling libraries, such as physical domain modeling libraries 1514, 1515, and 1516, for modeling different physical systems. Exemplary physical domains include electrical, hydraulic, magnetic, mechanical rotation, mechanical translation, pneumatic, thermal, etc. Instances of the model element types provided by the libraries 1508, 1510, may be selected and included in an executable simulation model 1518, e.g., by the model editor 1504. The simulation engine 1506 may include an interpreter 1520, a model compiler 1522, which may include an Intermediate Representation (IR) builder 1524, and one or more solvers 1526a-c. Exemplary solvers include one or more fixed-step continuous solvers, which may utilize integration techniques based on Euler's Method or Huen's Method, and one or more variable-step solvers, which may be based on the Runge-Kutta and Dormand-Prince pair. A description of suitable solvers may be found in the Simulink User's Guide from The Math Works, Inc. (September 2019 ed.).

The simulation environment 1500 may include or have access to other components, such as a code generator 1528 and a compiler 1530. The code generator 1528 may generate code, such as code 1532, based on the executable simulation model 1518. For example, the code 1532 may have the same or equivalent functionality and/or behavior as specified by the executable simulation model 1518. The generated code 1532, however, may be in form suitable for execution outside of the simulation environment 1500. Accordingly, the generated code 1532, which may be source code, may be referred to as standalone code. The compiler 1530 may compile the generated code 1532 to produce an executable, e.g., object code, that may be deployed on a target platform for execution, such as an embedded system.

Exemplary code generators include the HDL Coder, the Simulink Coder, the Embedded Coder, the GPU Coder, the MATLAB Coder, and the Simulink PLC Coder products from The Math Works, Inc. of Natick, MA, and the TargetLink product from dSpace GmbH of Paderborn Germany. Exemplary code 1532 that may be generated for the executable simulation model 1518 includes textual source code compatible with a programming language, such as the C, C++, C#, Ada, Structured Text, Fortran, and MATLAB languages, among others. Alternatively or additionally, the generated code 1532 may be (or may be compiled to be) in the form of object code or machine instructions, such as an executable, suitable for execution by a target device of an embedded system, such as a central processing unit (CPU), a microprocessor, a digital signal processor, etc. In some embodiments, the generated code 1532 may be in the form of a hardware description, for example, a Hardware Description Language (HDL), such as VHDL, Verilog, a netlist, or a Register Transfer Level (RTL) description. The hardware description may be utilized by one or more synthesis tools to configure a programmable hardware device, such as Programmable Logic Devices (PLDs), Field Programmable Gate Arrays (FPGAs), and Application Specific Integrated Circuits (ASICs), among others. The generated code 1532 may be stored in memory, such as a main memory or persistent memory or storage, of a data processing device.

While the discussion herein has focused on exemplary embodiments, it should be appreciated that various changes in form and detail may be made without departing from the intended scope as defined in the appended claims.

The invention claimed is:

1. A method performed by a processor of an electronic device, comprising:
   with the processor,
      determining a next breakpoint for a lookup table that approximates a function or set of data values and produces output values based on input values, wherein the next breakpoint lies between a most recently established breakpoint in a breakpoint sequence and a breakpoint candidate positioned at a smallest input value of the lookup table among positions of breakpoint candidates;
      wherein the breakpoint sequence extends from a breakpoint positioned at a largest input value of the lookup table among the positions of the breakpoints to a breakpoint positioned at a smallest input value of the lookup table among the positions of the breakpoints;
      determining an associated table value for the next breakpoint in the lookup table, wherein the next breakpoint is determined by:
         identifying breakpoint candidates that lie between the most recently established breakpoint and a breakpoint candidate with a position at a smallest input value of the lookup table among the positions of the breakpoint candidates;
         determining associated table values for the identified breakpoint candidates;
         choosing as the next breakpoint from the identified breakpoint candidates a breakpoint candidate that:
            is in a subset of selected breakpoint candidates where, for each of the selected breakpoint candidates, an error function value of an output data value of the lookup table for each test point in an interval extending between the most recently established breakpoint and the selected breakpoint candidate is less than an error threshold, and
            is a breakpoint candidate positioned at a smallest input value of the lookup table among positions of the selected breakpoint candidates in the subset; and
      generating at least a portion of the lookup table with the most recently established breakpoint, the associated table value for the most recently established breakpoint, the next breakpoint, and the determined table value for the next breakpoint.

2. The method of claim 1, wherein the determining associated table values for the identified breakpoint candidates comprises determining optimal or near-optimal table values as the table values for the identified breakpoint candidates.

3. The method of claim 1, wherein the lookup table employs zero-order interpolation to provide output values from the lookup table for ones of the test points that are in between pairs of the breakpoints.

4. The method of claim 3, wherein the zero-order interpolation is one of flat interpolation or nearest interpolation.

5. The method of claim 1, further comprising:
   determining if it is feasible to establish a breakpoint at a position with a largest input value among the positions of the breakpoint candidates; and
   where it is determined to be feasible to establish the breakpoint at a position with the largest input value among the positions of the breakpoint candidates, establishing the breakpoint at the position with the largest input value among the positions of the breakpoint candidates.

6. A non-transitory processor-readable storage medium storing instructions for execution by a processor of an electronic device to cause the processor to:
   determine a next breakpoint for a lookup table that approximates a function or set of data points and produces output data values based on input values, wherein the next beakpoint lies between a most recently established breakpoint in a breakpoint sequence and a breakpoint candidate positioned at a smallest input value of the lookup table among positions of breakpoint candidates;
   wherein the breakpoint sequence extends from a breakpoint positioned at a largest input value of the lookup table among positions of the breakpoints to a breakpoint positioned at a smallest input value of the lookup table among the positions of the breakpoints;
   determine an associated table value for the next breakpoint in the lookup table, wherein the next breakpoint is determined by:
      identifying breakpoint candidates that lie between the most recently established breakpoint and a breakpoint candidate positioned at a smallest input value of the lookup table among positions of the breakpoint candidates;
      determining associated table values for the identified breakpoint candidates;
      choosing from the identified breakpoint candidates a breakpoint candidate that:
         is in a subset of selected breakpoints candidates where, for each of the selected breakpoint candidates, an error function value of an output data value of the lookup table for each test point in an interval extending between the most recently established breakpoint and the selected breakpoint candidate is less than an error threshold;
         is a breakpoint candidate positioned at a smallest input value of the lookup table among positions of the selected breakpoint candidates in the subset; and
   generate at least a portion of the lookup table with the most recently established breakpoint, the associated table value for the most recently established breakpoint, the next breakpoint, and the determined table value for the next breakpoint.

7. The non-transitory processor-readable storage medium of claim 6, wherein the determining table values for the breakpoint candidates comprises determining optimal or near-optimal table values as the table values for the breakpoint candidates.

8. The non-transitory processor-readable storage medium of claim 6, wherein the lookup table employs zero-order interpolation to provide output from the lookup table for ones of the test points that are in between pairs of the breakpoints.

9. The non-transitory processor-readable storage medium of claim 8, wherein the zero-order interpolation is one of flat interpolation or nearest interpolation.

10. An electronic device comprising:
a non-transitory processor-readable storage medium storing computer programming instructions;
a processor configured for executing the computer programming instructions to cause the processor to:
determine a next breakpoint for a lookup table that approximates a function or a set of data values and produces output values based on input values, wherein the next breakpoint lies between a most recently established breakpoint in a breakpoint sequence and a breakpoint candidate positioned at a smallest input value of the lookup table among positions of breakpoint candidates;
wherein the breakpoint sequence extends from a breakpoint positioned at a largest input value of the lookup table among positions of the breakpoints to a breakpoint positioned at a smallest input value of the lookup table among the positions of the breakpoints;
determine an associated table value for the next breakpoint in the lookup table, wherein the next breakpoint is determined by:
identifying breakpoint candidates for breakpoints that lie between the most recently established breakpoint and a breakpoint candidate positioned at a smallest input value of the lookup table among positions of the breakpoint candidates;
determining associated table values for the identified breakpoint candidates;
choosing from the identified breakpoint candidates as the next breakpoint a breakpoint that:
is in a subset of selected breakpoints candidates where, for each of the selected breakpoint candidates, an error function value of an output data value of the lookup table for each test point in an interval extending between the most recently established breakpoint and the selected breakpoint candidate is less than an error threshold;
is a breakpoint candidate positioned at a smallest input value of the lookup table among positions of the selected breakpoint candidates in the subset; and
generate at least a portion of the lookup table with the most recently established breakpoint, associated table value for the most recently established breakpoint, the next breakpoint, and the determined table value for the next breakpoint.

11. A method performed by a processor of an electronic device, comprising:
determining a next breakpoint that lies between a most recently established breakpoint and a breakpoint candidate positioned at a smallest input value of the lookup table among positions of breakpoint candidates in a breakpoint candidate sequence and determining an associated table value for the next breakpoint in the lookup table, which approximates a function or set of data points, by:
applying a binary search algorithm to the breakpoint candidates to locate the next breakpoint as a breakpoint candidate that:
is in a subset of selected breakpoint candidates where, for each of the selected breakpoint candidates, an error function value of an output data value of the lookup table for each test point in an interval extending between the most recently established breakpoint and the selected breakpoint candidate is less than an error threshold;
is a breakpoint candidate positioned at a smallest input value of lookup table among positions of the selected breakpoint candidates in the subset; and
generating at least a portion of the lookup table with the most recently established breakpoint, the associated table value for the most recently established breakpoint, the next breakpoint, and the determined table value for the next breakpoint.

12. The method of claim 11, wherein the binary search algorithm starts with a one of the breakpoint candidates positioned approximately halfway between the most recently established breakpoint and the breakpoint candidate positioned at the smallest input value of the lookup table among the positions of the breakpoint candidates.

13. The method of claim 11, wherein the binary search algorithm next examines one of the breakpoint candidates positioned approximately halfway between the most recently established breakpoint and the one of the breakpoint candidates positioned approximately halfway between the most recently established breakpoint and the breakpoint candidate positioned at the smallest input value of the lookup table among the positions of the breakpoint candidates.

14. A non-transitory processor-readable storage medium storing instructions for execution by a processor to cause the processor to:
determine a next breakpoint that lies between a most recently established breakpoint and a breakpoint candidate positioned at the smallest input value of the lookup table among positions of breakpoint candidates in a breakpoint candidate sequence and determine an associated table value for the next breakpoint in a lookup table, which approximates a function or set of data points, by:
applying a binary search algorithm to breakpoint candidates to locate the next breakpoint as a breakpoint candidate that:
is in a subset of selected breakpoint candidates where, for each of the selected breakpoint candidates, an error function value of an output data value of the lookup table for each test point in an interval extending between the most recently established breakpoint and the selected breakpoint candidate is less than an error threshold;
is a breakpoint candidate positioned at a smallest input value of the lookup table among positions of the selected breakpoint candidates in the subset; and
generate at least a portion of the lookup table with the most recently established breakpoint, the associated table value for the most recently established breakpoint, the next breakpoint, and the determined table value for the next breakpoint.

15. The non-transitory processor-readable storage medium of claim 14, wherein the binary search algorithm starts with one of the breakpoint candidates positioned approximately halfway between the most recently established breakpoint and the breakpoint candidate positioned at the smallest input value of the lookup table among the positions of the breakpoint candidates.

16. The non-transitory processor-readable storage medium of claim 15, wherein the binary search algorithm next examines one of the breakpoint candidates positioned approximately halfway between the most recently established breakpoint and the breakpoint candidate positioned approximately halfway between the most recently established breakpoint and the breakpoint candidate positioned at the smallest input value of the lookup table among the positions of the breakpoint candidates.

17. A method performed by a processor of an electronic device, comprising:
with the processor, co-optimizing selection of breakpoints and table values for a lookup table that approximates a function or set of data points such that:
breakpoint values are selected to minimize memory space required to store the lookup table, and
table values for the breakpoint are chosen to reduce error between the table values and the values of the function at the breakpoints or values of the data points at the breakpoints; and
with the processor, generating at least a portion of the lookup table with the breakpoints and table values.

18. The method of claim 17, wherein the co-optimizing entails selecting optimal or near-optimal table values for selected breakpoint candidates and choosing as a next breakpoint a chosen breakpoint from among positions of the selected breakpoint candidates that is in a subset of selected breakpoint candidates where, for each of the selected breakpoint candidates, an error function value of a data value output of the lookup table for each test point in an interval extending between a most recently established breakpoint and the selected breakpoint candidate is less than an error threshold, and the chosen breakpoint is a closest positioned breakpoint to the breakpoint candidate positioned at a smallest input value of the lookup table among the positions of the selected breakpoint candidates in the subset.

19. A non-transitory processor-readable storage medium storing instructions for execution by a processor to cause the processor to:
co-optimize selection of breakpoints and table values for a lookup table that approximates a function or set of data points such that:
breakpoint values are selected to minimize memory space required to store the lookup table, and
table values for the breakpoint are chosen to reduce error between the table values and the values of the function at the breakpoints or values of the data points at the breakpoints; and
generate at least a portion of the lookup table with the breakpoints and table values.

20. A method performed by a processor of an electronic device, comprising:
determining if it is feasible to determine a next breakpoint that lies between a most recently established breakpoint in a breakpoint sequence and a breakpoint candidate positioned at a smallest input value of a lookup table among positions of breakpoint candidates such that an error function value of a data value output of the lookup table for each test point in an interval extending between the most recently established breakpoint and the next breakpoint is less than an error threshold;
if it is determined to not be feasible, outputting an indication of infeasibility,
if it is determined to be feasible,
determining a next breakpoint that lies between the most recently established breakpoint and a breakpoint candidate positioned at a smallest input value of the lookup table among positions of the breakpoint candidates in a breakpoint candidate sequence and an associated table value for the next breakpoint in a lookup table, which approximates a function or set of data points, by:
applying a binary search algorithm to the breakpoint candidates to locate the next breakpoint as a breakpoint candidate that:
is in a subset of selected breakpoint candidates where, for each of the selected breakpoint candidates, an error function value of an output data value of the lookup table for each test point in an interval extending between the most recently established breakpoint and the selected breakpoint candidate is less than an error threshold;
is a breakpoint candidate positioned at a smallest input value of the lookup table among positions of the selected breakpoint candidates in the subset; and
generating at least a portion of the lookup table with the most recently established breakpoint, the table value for the most recently established breakpoint, the next breakpoint, and the determined table value for the next breakpoint.

\* \* \* \* \*

UNITED STATES PATENT AND TRADEMARK OFFICE
CERTIFICATE OF CORRECTION

PATENT NO. : 12,141,021 B2  
APPLICATION NO. : 18/153713  
DATED : November 12, 2024  
INVENTOR(S) : Yifu Zhang et al.

Page 1 of 1

It is certified that error appears in the above-identified patent and that said Letters Patent is hereby corrected as shown below:

In the Claims

Column 20, Claim 6, Line 28: replace "wherein the next beakpoint lies" with --wherein the next breakpoint lies--

Signed and Sealed this
Fourteenth Day of January, 2025

Derrick Brent
*Acting Director of the United States Patent and Trademark Office*